United States Patent
Khoshnevisan et al.

(10) Patent No.: US 11,445,537 B2
(45) Date of Patent: Sep. 13, 2022

(54) DATA TRANSMISSION RELIABILITY WITH MULTIPLE DOWNLINK CONTROL INFORMATION SIGNALS

(71) Applicant: QUALCOMM Incorporated, San Diego, CA (US)

(72) Inventors: Mostafa Khoshnevisan, San Diego, CA (US); Yan Zhou, San Diego, CA (US); Tao Luo, San Diego, CA (US); Xiaoxia Zhang, San Diego, CA (US); Seyed Ali Akbar Fakoorian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 187 days.

(21) Appl. No.: 16/914,087

(22) Filed: Jun. 26, 2020

(65) Prior Publication Data
US 2021/0014883 A1   Jan. 14, 2021

Related U.S. Application Data

(60) Provisional application No. 62/871,574, filed on Jul. 8, 2019.

(51) Int. Cl.
*H04W 72/12* (2009.01)
*H04W 72/04* (2009.01)

(52) U.S. Cl.
CPC ..... *H04W 72/1289* (2013.01); *H04W 72/042* (2013.01)

(58) Field of Classification Search
CPC .................. H04W 72/042; H04W 72/1289
(Continued)

(56) References Cited

U.S. PATENT DOCUMENTS 10,638,462 B2 * 4/2020 Park ........................ H04L 5/00
2019/0020506 A1   1/2019 Cheng et al.
(Continued)

FOREIGN PATENT DOCUMENTS

WO   WO-2019031850 A1 *  2/2019  ............. H04B 7/024

OTHER PUBLICATIONS

International Search Report and Written Opinion—PCT/US2020/040057—ISA/EPO—dated Oct. 15, 2020.
(Continued)

*Primary Examiner* — Peter G Solinsky
(74) *Attorney, Agent, or Firm* — Holland & Hart LLP

(57) ABSTRACT

Methods, systems, and devices for wireless communications are described. A user equipment (UE) may identify a capability of receiving multiple downlink control information (DCI) signals or messages from one or more base stations indicating corresponding downlink data channels for a same transport block (TB) (e.g., for a same feedback process, where each downlink data channel has a same feedback identification). Subsequently, the UE may receive one or more DCIs, each scheduling a respective downlink data channel for the same TB, where the UE is then expected to transmit acknowledgement (ACK) feedback for the TB. Accordingly, the UE may transmit the ACK feedback (e.g., in a joint feedback message or via separate feedback messages) for the corresponding downlink data channels based on attempting to decode the TB on resources of the downlink data channels as indicated by the multiple DCIs.

30 Claims, 22 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0081763 | A1* | 3/2019 | Akkarakaran | H04L 1/1607 |
| 2019/0349964 | A1* | 11/2019 | Liou | H04W 72/1284 |
| 2020/0221428 | A1* | 7/2020 | Moon | H04W 16/28 |
| 2020/0228248 | A1* | 7/2020 | Islam | H04L 1/1861 |
| 2020/0382207 | A1* | 12/2020 | Medles | H04B 7/18532 |
| 2021/0028891 | A1* | 1/2021 | Zhou | H04L 1/1864 |
| 2021/0153185 | A1 | 5/2021 | Schober et al. | |
| 2021/0329676 | A1* | 10/2021 | Yang | H04W 4/46 |

OTHER PUBLICATIONS

NTT Docomo., et al., "Enhancements on Multi-TRP/Panel Transmission", 3GPP Draft, R1-1906224, 3GPP TSG RAN WG1 #97, 3rd Generation PartnershipProject (3GPP), Mobile Competence Centre, 650, Route Des Lucioles, F-06921Sophia-Antipolis Cedex, France,, vol. RAN WG1, No. Reno, USA; May 13, 2019-May 17, 2019, May 13, 2019, (May 13, 2019), EFS, XP051727678, Retrieved from the Internet: URL: http://www.3gpp.org/ftp/Meetings%5F3GPP%5FSYNC/RAN1/Docs/R1%2D1906224%2Ezip [retrieved on May 13, 2019], p. 19, Paragraph 3.1.1—p. 21, Paragraph 3.1.2, Last Two Agreements, p. 2 Last Two Agreements, p. 3 Proposal 2-3, p. 6 p. 7 Proposal 2-4, p. 8 Proposal 2-11, p. 12.

Qualcomm Incorporated: "Multi-TRP Enhancements", 3GPP Draft, 3GPP TSG-RAN WG1 Meeting #97, R1-1907289, Multi-TRP Enhancements, 3RD Generation Partnership Project (3GPP), Mobile Competence Centre, 650, Route Des Lucioles, F-06921, Sophia-Antipolis Cedex, France, vol. RAN WG1, No. Reno, Nevada, USA, May 13, 2019-May 17, 2019, May 4, 2019 (May 4, 2019), XP051709312, 25 Pages, Retrieved from the Internet: URL: http://www.3gpp.org/ftp/tsg%5Fran/WG1%5FRL1/TSGR1%5F97/Docs/R1%2D1907289%2Ezip [retrieved on May 4, 2019] pp. 4-6, 3.1 POSCH and PDCCH Related Enhancements pp. 6-7, 3.1.1 UE Capability Framework for Multi-TRP pp. 7-8, 3.2.1 Joint HARQ-Ack Payload I Feedback p. 7, figure 1, sections 1-3, Introduction Agreement, p. 5, Agreement, Section 3.1.1, p. 6, Section 3.2, Section 3.2.1, p. 7.

* cited by examiner

… attempt to decode the first TB on data channel resources of the set of data channels indicated by the received first DCI and the received second DCI, and transmit, to the base station during the ACK information transmission occasion, ACK information associated with the first TB based on the attempted decoding.

Another apparatus for wireless communication at a UE is described. The apparatus may include means for identifying a capability of the UE to receive a set of DCIs for a set of data channels for a first TB, the set of DCIs each associated with an ACK information transmission occasion occurring after reception of the set of data channels, monitoring for the set of DCIs according to the identified capability, receiving, from a base station based on the monitoring, a first DCI and a second DCI scheduling the first TB, the first DCI received in a first CORESET of a first group of CORESETs and the second DCI received in a second CORESET of a second group of CORESETs, attempting to decode the first TB on data channel resources of the set of data channels indicated by the received first DCI and the received second DCI, and transmitting, to the base station during the ACK information transmission occasion, ACK information associated with the first TB based on the attempted decoding.

A non-transitory computer-readable medium storing code for wireless communication at a UE is described. The code may include instructions executable by a processor to identify a capability of the UE to receive a set of DCIs for a set of data channels for a first TB, the set of DCIs each associated with an ACK information transmission occasion occurring after reception of the set of data channels, monitor for the set of DCIs according to the identified capability, receive, from a base station based on the monitoring, a first DCI and a second DCI scheduling the first TB, the first DCI received in a first CORESET of a first group of CORESETs and the second DCI received in a second CORESET of a second group of CORESETs, attempt to decode the first TB on data channel resources of the set of data channels indicated by the received first DCI and the received second DCI, and transmit, to the base station during the ACK information transmission occasion, ACK information associated with the first TB based on the attempted decoding.

Some examples of the method, apparatuses, and non-transitory computer-readable medium described herein may further include operations, features, means, or instructions for transmitting the identified capability to the base station in a UE capability report.

In some examples of the method, apparatuses, and non-transitory computer-readable medium described herein, the UE capability report may further indicate whether the UE is capable of performing soft combining of the set of data channels.

In some examples of the method, apparatuses, and non-transitory computer-readable medium described herein, a payload size of the ACK information may be based on the identified capability of the UE to receive the set of DCIs for the set of data channels for the first TB.

In some examples of the method, apparatuses, and non-transitory computer-readable medium described herein, a type of the ACK information may be configured as dynamic and the payload size of the ACK information associated with each downlink assignment index (DAI) may be a same size.

In some examples of the method, apparatuses, and non-transitory computer-readable medium described herein, a type of the ACK information may be configured as semi-static and the payload size of the ACK information associated with each candidate data channel occasion may be a same size.

In some examples of the method, apparatuses, and non-transitory computer-readable medium described herein, a first total DAI for the first DCI may count both the first DCI and the second DCI, where the first and second DCIs may be not monitored in a same physical downlink control channel (PDCCH) monitoring occasion.

In some examples of the method, apparatuses, and non-transitory computer-readable medium described herein, receiving the first DCI and the second DCI may include operations, features, means, or instructions for receiving, from the base station, an indication in the first DCI that the base station will transmit the second DCI.

Some examples of the method, apparatuses, and non-transitory computer-readable medium described herein may further include operations, features, means, or instructions for receiving a DCI associated with a second TB, where a first payload size of the ACK information associated with the first TB may be different than a second payload size of the ACK information associated with the first TB, and the ACK information associated with the second TB may be transmitted with the ACK information associated with the first TB.

Some examples of the method, apparatuses, and non-transitory computer-readable medium described herein may further include operations, features, means, or instructions for separately counting a first set of one or more DAIS and a second set of one or more DAIS, where the first set of one or more DAIS may be associated with DCIs for TBs for which a single DCI may be transmitted, and the second set of one or more DAIS may be associated with DCIs for TBs for which multiple DCIs may be transmitted.

Some examples of the method, apparatuses, and non-transitory computer-readable medium described herein may further include operations, features, means, or instructions for receiving a first data signal associated with the first TB and the first DCI, where the first data signal may be a retransmission of a previously received data signal associated with the first TB, receiving a second data signal associated with the first TB and the second DCI, where the second data signal may be a retransmission of the previously received data signal associated with the first TB, performing a first soft combining procedure of the received first data signal and the previously received data signal, and performing a second soft combining procedure of the received second data signal and the previously received data signal.

In some examples of the method, apparatuses, and non-transitory computer-readable medium described herein, receiving the first DCI and the second DCI may include operations, features, means, or instructions for receiving a first data signal associated with the first TB and the first DCI, where the first data signal may be a retransmission of a previously received data signal associated with the first TB, receiving a second data signal associated with the first TB and the second DCI, where the second data signal may be a retransmission of the previously received data signal associated with the first TB, determining that the previously received data signal was associated with a DCI received in one of the first CORESET or the second CORESET, and performing, based on the determining, a soft combining procedure of the received first data signal and the previously received data signal, or the received second data signal and the previously received data signal.

Some examples of the method, apparatuses, and non-transitory computer-readable medium described herein may further include operations, features, means, or instructions for receiving a first data signal associated with the first TB and the first DCI, where the first data signal may be a retransmission of a previously received data signal associated with the first TB, receiving a second data signal associated with the first TB and the second DCI, where the second data signal may be a retransmission of the previously received data signal associated with the first TB, and performing a soft combining procedure of the received first data signal and the previously received data signal, or the received second data signal and the previously received data signal, based on a selection rule.

Some examples of the method, apparatuses, and non-transitory computer-readable medium described herein may further include operations, features, means, or instructions for receiving a first data signal associated with the first TB and the first DCI, receiving a second data signal associated with the first TB and the second DCI, receiving, after transmitting the ACK information, a third DCI scheduling the first TB, receiving a third data signal associated with the third DCI, where the third data signal may be a retransmission of the first TB, performing a first soft combining procedure of the third data signal and the first data signal, and performing a second soft combining procedure of the third data signal and the second data signal.

In some examples of the method, apparatuses, and non-transitory computer-readable medium described herein, receiving the first DCI and the second DCI may include operations, features, means, or instructions for receiving a first data signal associated with the first TB and the first DCI, receiving a second data signal associated with the first TB and the second DCI, receiving, after transmitting the ACK information, a third DCI scheduling the first TB, receiving a third data signal associated with the third DCI, where the third data signal may be a retransmission of the first TB, determining that both the first DCI and the third DCI were received in the first CORESET or a first group of CORESETs that includes at least the first CORESET, and performing, based on the determining, a soft combining procedure of the third data signal and the first data signal.

Some examples of the method, apparatuses, and non-transitory computer-readable medium described herein may further include operations, features, means, or instructions for receiving a first data signal associated with the first TB and the first DCI, receiving a second data signal associated with the first TB and the second DCI, receiving, after transmitting the ACK information, a third DCI scheduling the first TB, receiving a third data signal associated with the third DCI, where the third data signal may be a retransmission of the first TB, and performing a soft combining procedure of the third data signal and the first data signal, or the third data signal and the second data signal, based on a selection rule.

Some examples of the method, apparatuses, and non-transitory computer-readable medium described herein may further include operations, features, means, or instructions for transmitting an indication of a capability of the UE to process one or more of the set of data channels.

In some examples of the method, apparatuses, and non-transitory computer-readable medium described herein, the set of DCIs may indicate a same hybrid automatic repeat request (HARD) process for the first TB, or a same new data indicator, or a combination thereof.

In some examples of the method, apparatuses, and non-transitory computer-readable medium described herein, the data channel resources may be spatial divisional multiplexed (SDMed), frequency division multiplexed (FDMed), or time division multiplexed (TDMed), or partially overlapping, or a combination thereof.

In some examples of the method, apparatuses, and non-transitory computer-readable medium described herein, the received first DCI and the received second DCI may indicate a same set of resources for transmission of the ACK information.

Some examples of the method, apparatuses, and non-transitory computer-readable medium described herein may further include operations, features, means, or instructions for transmitting a first ACK bit, a second ACK bit, and a combined ACK bit in the same set of resources for transmission of the ACK information, where the first ACK bit corresponds to a first data signal for the TB associated with a first of the set of DCIs, the second ACK bit corresponds to a second data signal for the TB associated with a second of the set of DCIs, and the combined ACK bit corresponds to a result of soft combining the first data signal and the second data signal.

In some examples of the method, apparatuses, and non-transitory computer-readable medium described herein, the received first DCI and the received second DCI may indicate different sets of resources for transmission of the ACK information.

In some examples of the method, apparatuses, and non-transitory computer-readable medium described herein, the UE may be capable of soft combining, and transmitting the ACK information associated with the first TB may include operations, features, means, or instructions for transmitting a first ACK bit and a combined ACK bit in a first set of the different sets of resources for transmission of the ACK information, transmitting a second ACK bit and the combined ACK bit in a second set of the different sets of resources for transmission of the ACK information, and where the first ACK bit corresponds to a first data signal for the TB associated with a first of the set of DCIs, the second ACK bit corresponds to a second data signal for the TB associated with a second of the set of DCIs, and the combined ACK bit corresponds to a result of soft combining the first data signal and the second data signal.

In some examples of the method, apparatuses, and non-transitory computer-readable medium described herein, the ACK information associated with the first TB may include a first ACK bit and a second ACK bit for the first TB, where the first ACK bit may be for a first data signal associated with the received first DCI of the set of DCIs, and the second ACK bit may be for a second data signal associated with the received second DCI of the set of DCIs.

In some examples of the method, apparatuses, and non-transitory computer-readable medium described herein, the ACK information associated with the first TB may include a first ACK bit and a combined ACK bit for the first TB, where the first ACK bit may be for a first data signal associated with the received first DCI of the set of DCIs, and the combined ACK bit may be for a combination of the first data signal and a second data signal associated with the received second DCI of the set of DCIs.

In some examples of the method, apparatuses, and non-transitory computer-readable medium described herein, the ACK information associated with the first TB may include a first combined ACK bit and a second combined ACK bit for the first TB, where the first combined ACK bit may be for a combination of a first data signal associated with the received first DCI of the set of DCIs and a second data signal associated with the received second DCI of the set of DCIs, and the second combined ACK bit may be for the combination of the first data signal and the second data signal.

In some examples of the method, apparatuses, and non-transitory computer-readable medium described herein, receiving the first DCI and the second DCI scheduling the first TB may include operations, features, means, or instructions for receiving, from a first transmission reception point (TRP), the first DCI for the first TB in the first CORESET, and receiving, from a second TRP, the second DCI for the first TB in the second CORESET.

In some examples of the method, apparatuses, and non-transitory computer-readable medium described herein, the first CORESET may be part of a first CORESET group, and the second CORESET may be part of the first CORESET group or a second CORESET group.

Some examples of the method, apparatuses, and non-transitory computer-readable medium described herein may further include operations, features, means, or instructions for receiving, from the first TRP, the first TB on data channel resources of a first data channel of the set of data channels, and receiving, from the second TRP, the first TB on data channel resources of a second data channel of the set of data channels.

Some examples of the method, apparatuses, and non-transitory computer-readable medium described herein may further include operations, features, means, or instructions for determining that a first cyclic redundancy check (CRC) value of the first DCI may be scrambled with a same radio network temporary identifier (RNTI) as a second CRC value of the second DCI.

Some examples of the method, apparatuses, and non-transitory computer-readable medium described herein may further include operations, features, means, or instructions for determining that a first set of scheduling information in the first DCI matches a second set of scheduling information in the second DCI, and attempting to decode a first data signal associated with the first DCI and a second data signal associated with the second DCI based on the determining.

In some examples of the method, apparatuses, and non-transitory computer-readable medium described herein, determining the first set of scheduling information in the first DCI matches the second set of scheduling information in the second DCI further may include operations, features, means, or instructions for calculating a TB size based on the first set of scheduling information being the same as a second TB size calculated based on the second set of scheduling information.

Some examples of the method, apparatuses, and non-transitory computer-readable medium described herein may further include operations, features, means, or instructions for receiving a set of DCIs from a set of different TRPs, or a set of different antenna arrays associated with a same TRP, or a set of different transmit beams associated with a same TRP; or a set of different transmission configuration indicator (TCI) states associated with a same TRP, or a combination thereof.

A method of wireless communication at a base station is described. The method may include receiving, from a UE, an indication of a capability of the UE to receive a set of DCIs for a set of data channels for a first TB, transmitting, to the UE, a first DCI of the set of DCIs scheduling the first TB, the first DCI transmitted in a first CORESET of a first group of CORESETs, transmitting, to the UE, a second DCI of the set of DCIs scheduling the first TB, the second DCI transmitted in a second CORESET of a second group of CORESETs, transmitting, according to the first DCI, a first data signal on a first data channel of the set of data channels, transmitting, according to the second DCI, a second data signal on a second data channel of the set of data channels, and receiving, from the UE based on the received indication of the capability, ACK information associated with the first TB.

An apparatus for wireless communication at a base station is described. The apparatus may include a processor, memory coupled with the processor, and instructions stored in the memory. The instructions may be executable by the processor to cause the apparatus to receive, from a UE, an indication of a capability of the UE to receive a set of DCIs for a set of data channels for a first TB, transmit, to the UE, a first DCI of the set of DCIs scheduling the first TB, the first DCI transmitted in a first CORESET of a first group of CORESETs, transmit, to the UE, a second DCI of the set of DCIs scheduling the first TB, the second DCI transmitted in a second CORESET of a second group of CORESETs, transmit, according to the first DCI, a first data signal on a first data channel of the set of data channels, transmit, according to the second DCI, a second data signal on a second data channel of the set of data channels, and receive, from the UE based on the received indication of the capability, ACK information associated with the first TB.

Another apparatus for wireless communication at a base station is described. The apparatus may include means for receiving, from a UE, an indication of a capability of the UE to receive a set of DCIs for a set of data channels for a first TB, transmitting, to the UE, a first DCI of the set of DCIs scheduling the first TB, the first DCI transmitted in a first CORESET of a first group of CORESETs, transmitting, to the UE, a second DCI of the set of DCIs scheduling the first TB, the second DCI transmitted in a second CORESET of a second group of CORESETs, transmitting, according to the first DCI, a first data signal on a first data channel of the set of data channels, transmitting, according to the second DCI, a second data signal on a second data channel of the set of data channels, and receiving, from the UE based on the received indication of the capability, ACK information associated with the first TB.

A non-transitory computer-readable medium storing code for wireless communication at a base station is described. The code may include instructions executable by a processor to receive, from a UE, an indication of a capability of the UE to receive a set of DCIs for a set of data channels for a first TB, transmit, to the UE, a first DCI of the set of DCIs scheduling the first TB, the first DCI transmitted in a first CORESET of a first group of CORESETs, transmit, to the UE, a second DCI of the set of DCIs scheduling the first TB, the second DCI transmitted in a second CORESET of a second group of CORESETs, transmit, according to the first DCI, a first data signal on a first data channel of the set of data channels, transmit, according to the second DCI, a second data signal on a second data channel of the set of data channels, and receive, from the UE based on the received indication of the capability, ACK information associated with the first TB.

In some examples of the method, apparatuses, and non-transitory computer-readable medium described herein, receiving the indication of the capability from the UE may include operations, features, means, or instructions for receiving a UE capability report that includes the indication.

In some examples of the method, apparatuses, and non-transitory computer-readable medium described herein, the UE capability report may further indicate whether the UE is capable of performing soft combining of the set of data channels.

In some examples of the method, apparatuses, and non-transitory computer-readable medium described herein, a payload size of the ACK information may be based on the indicated capability of the UE to receive the set of DCIs for the set of data channels for the first TB.

In some examples of the method, apparatuses, and non-transitory computer-readable medium described herein, a type of the ACK information may be configured as dynamic and the payload size of the ACK information associated with each DAI may be a same size.

In some examples of the method, apparatuses, and non-transitory computer-readable medium described herein, a type of the ACK information may be configured as semi-static and the payload size of the ACK information associated with each candidate data channel occasion may be a same size.

In some examples of the method, apparatuses, and non-transitory computer-readable medium described herein, a first total DAI for the first DCI may count both the first DCI and the second DCI, where the first and second DCIs may be not monitored in a same physical downlink control channel monitoring occasion.

In some examples of the method, apparatuses, and non-transitory computer-readable medium described herein, the first DCI may include an indication that the base station will transmit the second DCI.

Some examples of the method, apparatuses, and non-transitory computer-readable medium described herein may further include operations, features, means, or instructions for transmitting a DCI associated with a second TB, where a first payload size of the ACK information associated with the first TB may be different than a second payload size of the ACK information associated with the first TB, and the ACK information associated with the second TB may be received with the ACK information associated with the first TB.

Some examples of the method, apparatuses, and non-transitory computer-readable medium described herein may further include operations, features, means, or instructions for receiving, from the UE, an indication of a capability of the UE to process one or more of the set of data channels.

In some examples of the method, apparatuses, and non-transitory computer-readable medium described herein, the set of DCIs may indicate a same HARQ process for the first TB, or a same new data indicator, or a combination thereof.

In some examples of the method, apparatuses, and non-transitory computer-readable medium described herein, the data channel resources may be SDMed, FDMed, or TDMed, or partially overlapping, or a combination thereof.

In some examples of the method, apparatuses, and non-transitory computer-readable medium described herein, the first DCI and the second DCI may indicate a same set of resources for transmission of the ACK information.

In some examples of the method, apparatuses, and non-transitory computer-readable medium described herein, receiving the ACK information associated with the first TB may include operations, features, means, or instructions for receiving a first ACK bit, a second ACK bit, and a combined ACK bit in a first set of uplink resources, where the first ACK bit corresponds to the first data signal, the second ACK bit corresponds to the second data signal, and the combined ACK bit corresponds to a result of the UE soft combining the first data signal and the second data signal.

In some examples of the method, apparatuses, and non-transitory computer-readable medium described herein, the first DCI and the second DCI may indicate different sets of resources for transmission of the ACK information.

In some examples of the method, apparatuses, and non-transitory computer-readable medium described herein, receiving the ACK information associated with the first TB may include operations, features, means, or instructions for receiving a first ACK bit and a combined ACK bit in a first set of the different sets of resources for transmission of the ACK information, receiving a second ACK bit and the combined ACK bit in a second set of the different sets of resources for transmission of the ACK information, and where the first ACK bit corresponds to a first data signal for the TB associated with a first of the set of DCIs, the second ACK bit corresponds to a second data signal for the TB associated with a second of the set of DCIs, and the combined ACK bit corresponds to a result of the UE soft combining the first data signal and the second data signal.

In some examples of the method, apparatuses, and non-transitory computer-readable medium described herein, the ACK information associated with the first TB may include a first ACK bit and a second ACK bit for the first TB, where the first ACK bit may be for the first data signal, and the second ACK bit may be for the second data signal.

In some examples of the method, apparatuses, and non-transitory computer-readable medium described herein, the ACK information associated with the first TB may include a first ACK bit and a combined ACK bit for the first TB, where the first ACK bit may be for the first data signal, and the combined ACK bit may be for a combination of the first data signal and the second data signal.

In some examples of the method, apparatuses, and non-transitory computer-readable medium described herein, the ACK information associated with the first TB includes a first combined ACK bit and a second combined ACK bit for the first TB, where the first combined ACK bit may be for a combination of the first data signal and the second data signal, and the second combined ACK bit may be for the combination of the first data signal and the second data signal.

In some examples of the method, apparatuses, and non-transitory computer-readable medium described herein, the first DCI for the first TB may be transmitted via a first TRP in the first CORESET, and the second DCI for the first TB may be transmitted via a second TRP in the second CORESET.

In some examples of the method, apparatuses, and non-transitory computer-readable medium described herein, the first CORESET may be part of a first CORESET group, and the second CORESET may be part of the first CORESET group or a second CORESET group.

In some examples of the method, apparatuses, and non-transitory computer-readable medium described herein, the first data signal may be transmitted on the first data channel via a first TRP, and the second data signal may be transmitted on the second data channel via a second TRP.

In some examples of the method, apparatuses, and non-transitory computer-readable medium described herein, the first DCI and the second DCI may be transmitted via different TRPs, or different antenna arrays associated with a same TRP, or different transmit beams associated with a same TRP; or different TCI states associated with a same TRP, or a combination thereof.

DETAILED DESCRIPTION

Figure 1:
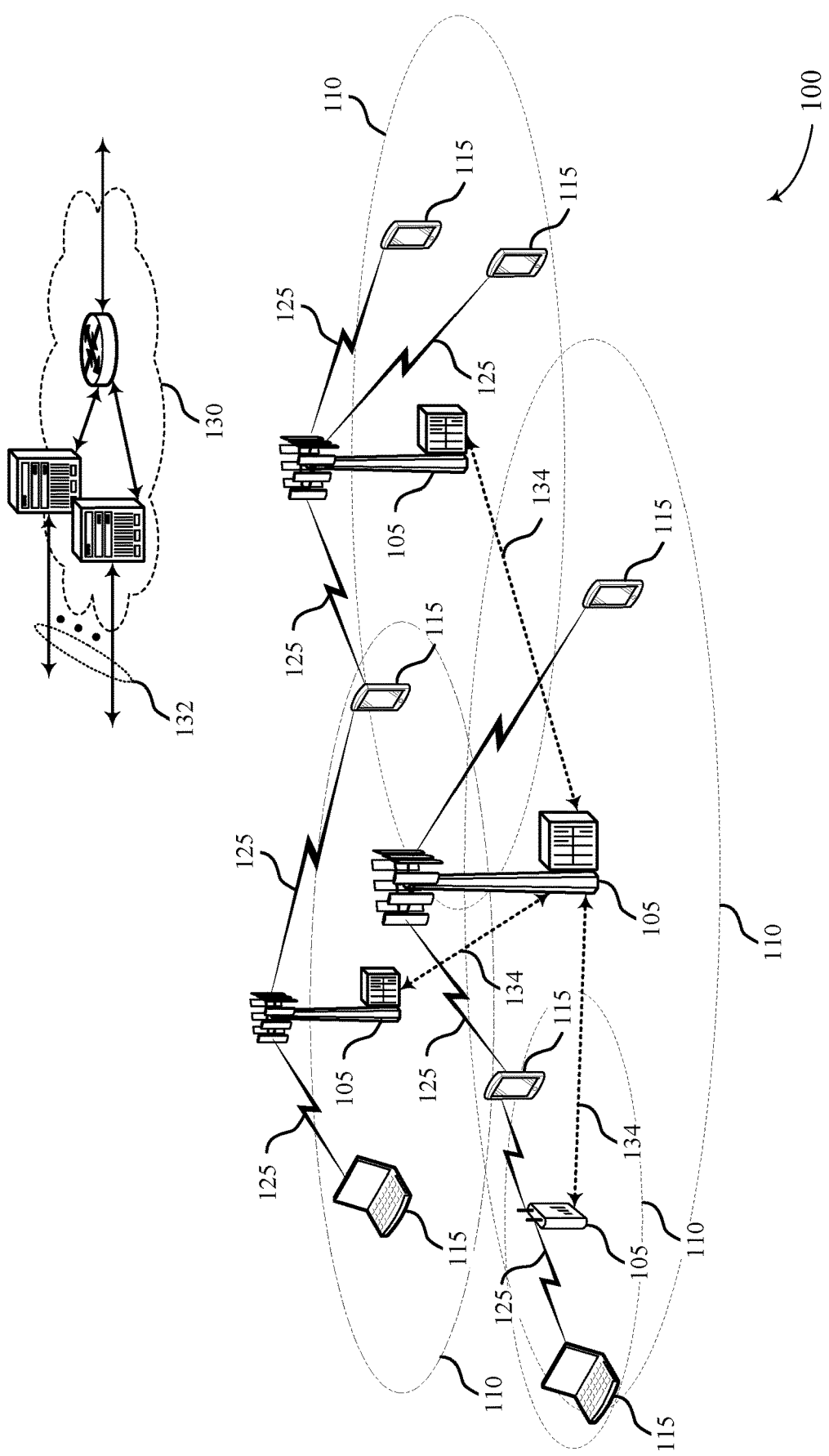
FIG. 1 illustrates an example of a system for wireless communications that supports data transmission reliability with multiple downlink control information (DCI) signals in accordance with aspects of the present disclosure.

In some wireless communications systems, a user equipment (UE) may communicate with multiple transmission reception points (TRPs) (e.g., base stations) at a same time. For example, the UE may monitor for and receive downlink control information (DCI) signals (e.g., DCIs, DCI messages, etc. via physical downlink control channels (PDCCHs)) from the multiple TRPs that schedule downlink data channels (e.g., physical downlink shared channel (PD-SCHs)) for the UE to receive downlink data from one or more of the multiple TRPs. Subsequently, the UE may transmit acknowledgement (ACK) feedback based on attempting to decode the downlink data channels (e.g., transmit an ACK if the decoding is successful and a negative ACK (NACK) if the decoding is unsuccessful or the DCI, downlink data channel, or both are not fully received). Accordingly, the UE may transmit the ACK feedback (e.g., in a physical uplink control channel (PUCCH)) corresponding to the downlink data channels scheduled by the multiple TRPs via the multiple DCIs either jointly (e.g., carried on a same uplink channel) or separately (e.g., carried on separate uplink channels).

In some cases, the UE and TRPs may use the multiple DCIs to increase reliability that a transport block (TB) is received and decoded successfully by the UE, where each of the multiple DCIs correspond to the same TB. For example, as long as one of the multiple DCIs and the corresponding downlink data channel is decoded, the TB transmission may be determined to be successful, where the UE may or may not perform a soft combining of multiple downlink data channels indicated by the multiple DCIs to further increase the reliability of successfully decoding the TB. However, when the multiple DCIs and downlink data channels are transmitted via different TRPs, the UE may experience issues when attempting to receive the DCIs and/or decoding the downlink data channels. For example, in some cases, the UE may not be expected to receive additional downlink data channels for a given feedback process (e.g., for a same TB) until an end of the expected transmission of ACK feedback for the given feedback process.

As described herein, the UE may identify a capability of receiving multiple DCIs from one or more TRPs (e.g., base stations) indicating corresponding downlink data channels (e.g., PDSCHs) for a same TB (e.g., for a same feedback process, where each downlink data channel has a same feedback identification (ID)). Subsequently, the UE may receive one or more DCIs, each DCI scheduling a respective downlink data channel for the same TB, where the UE is then expected to transmit ACK feedback for the TB (e.g., jointly or in separate feedback messages for the downlink data channels). Additionally, the UE may attempt to decode the downlink data channels even if both are received before the expected ACK feedback transmission (e.g., instead of the UE not being expected to receive additional downlink data channels for the given feedback process until an end of the expected ACK feedback transmission) Accordingly, the UE may then transmit ACK information for the corresponding downlink data channels based on the attempting to decode the TB on resources of the downlink data channels as indicated by the multiple DCIs. In some cases, the UE may transmit an indication of the identified capability for receiving the multiple DCIs to the base station, where the multiple DCIs are received based on the indication.

When transmitting the ACK information, the payload size may be fixed based on the multiple DCIs (e.g., and the corresponding downlink data channels) the UE can receive and the multiple downlink channels the UE can combine (e.g., via soft combining), such as transmitting one ACK bit for each of the multiple DCIs plus one ACK bit for the combination. Additionally or alternatively, the UE may transmit the ACK information based on a counter index corresponding to a total number of DCIs that the UE can receive (e.g., the UE may determine a DCI was missed based on the counter index and total number of DCIs). In some cases, the multiple DCIs may each include a bit that conveys whether another DCI scheduling a same TB follows each DCI, where the UE transmits the ACK information based on the bit. Additionally, the UE may combine a downlink data channel with one or more retransmissions of the downlink channel when attempting to decode the TB, where the downlink data channel and the retransmissions are transmitted for the TB. In some cases, the processing time for decoding the TB on the resources of the downlink data channels indicated by the multiple DCIs may vary based on transmitting a joint feedback message or separate feedback messages, when the downlink data channels are received, or a combination thereof.

Aspects of the disclosure are initially described in the context of a wireless communications system. Additionally, aspects of the disclosure are illustrated through an additional wireless communications system, TB processing configurations, ACK feedback configurations, a retransmission combination procedure, processing timing configurations, and a process flow. Aspects of the disclosure are further illustrated by and described with reference to apparatus diagrams, system diagrams, and flowcharts that relate to data transmission reliability with multiple DCI signals.

FIG. 1 illustrates an example of a wireless communications system 100 that supports data transmission reliability with multiple DCI signals in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same code-word) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval. Additionally, the HARQ feedback may include ACK information feedback to indicate whether a previous transmission was correctly received and decoded by a UE 115 (e.g., the UE 115 transmits an ACK if the previous transmission is correctly received and decoded or a NACK if the previous transmission is not successfully received or decoded).

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may communicate with multiple base stations 105 (e.g., TRPs, panels on one or more base stations/TRPs, etc.) simultaneously. For example, the UE 115 may receive multiple downlink messages indicated by multiple DCIs (e.g., DCI signals, DCI messages, etc.) from the multiple base stations 105, where the UE 115 is indicated to transmit ACK information (e.g., on an uplink message, such as ACK feedback on a PUCCH) for one or more of the received downlink messages. Efficient techniques are desired for transmitting the uplink ACK information for the multiple downlink messages from the multiple base stations 105.

Figure 2:
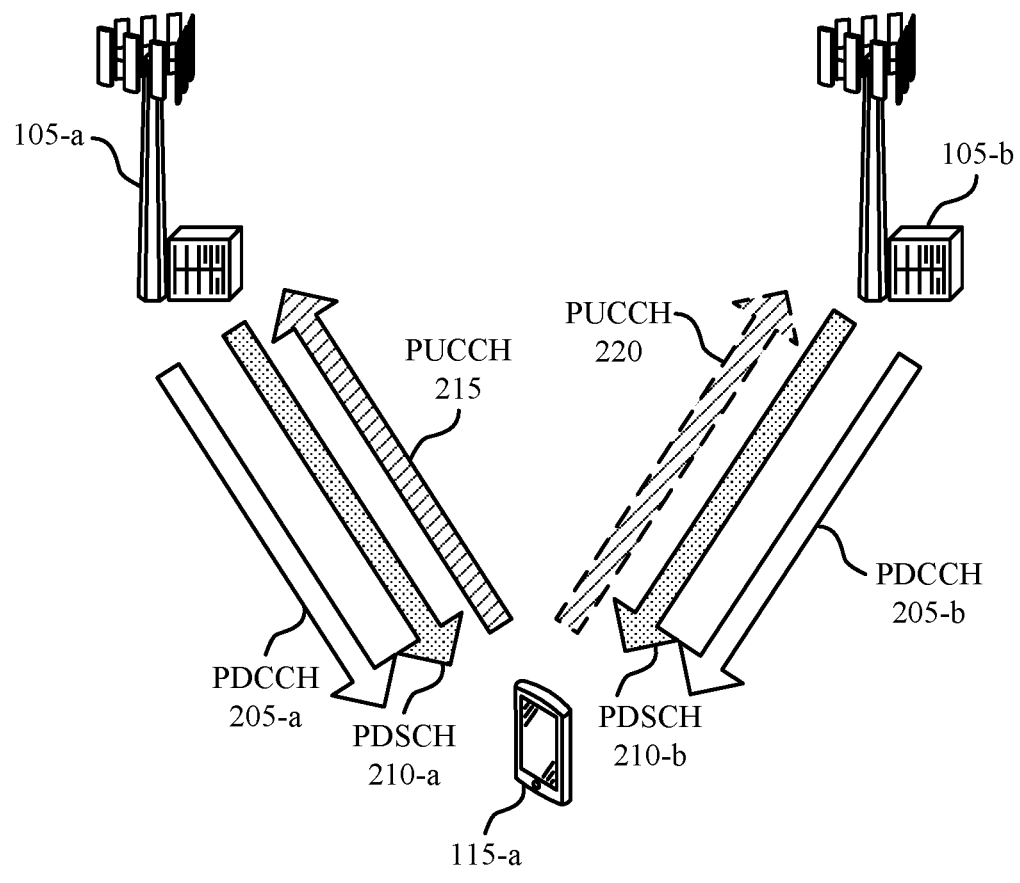
FIG. 2 illustrates an example of a wireless communications system that supports data transmission reliability with multiple DCI signals in accordance with aspects of the present disclosure.

FIG. 2 illustrates an example of a wireless communications system 200 that supports data transmission reliability with multiple DCI signals in accordance with aspects of the present disclosure. In some examples, wireless communications system 200 may implement aspects of wireless communications systems 100. Wireless communications system 200 may include a first base station 105-a (e.g., a first TRP (TRP1)), a second base station 105-b (e.g., a second TRP (TRP2)), and a UE 115-a, which may be examples of corresponding base stations 105 and UEs 115, respectively, as described above with reference to FIG. 1. In some cases, base station 105-a and base station 105-b may be two TRPs associated with a same base station 105, or different panels of a same base station 105, or different beams associated with a same base station 105, etc. Accordingly, UE 115-a may support communicating with both base station 105-a and base station 105-b simultaneously. For example, as described herein, UE 115-a may include a capability for receiving two (2) DCI signals or messages (e.g., or more than two DCI signals or messages), with a first DCI signal or message received from base station 105-a and a second DCI signal or message received from base station 105-b (e.g., two-DCI based multi-TRP transmission).

As shown, UE 115-a may receive a first DCI transmitted from base station 105-a (e.g., TRP1) via a first PDCCH 205-a that schedules a first PDSCH 210-a (e.g., PDSCH1) also transmitted from base station 105-a and may receive a second DCI transmitted from base station 105-b (e.g., TRP2) via a second PDCCH 205-b that schedules a second PDSCH 210-b (PDSCH2) also transmitted from base station 105-b. In some cases, PDSCH 210-a and 210-b may be non-overlapping (e.g., in separate time-frequency resources), partial-overlapping (e.g., share at least one same time-frequency resource), or full-overlapping (e.g., using all of the same time-frequency resources). For partial or full-overlapping conditions of PDSCH 210-a and 210-b, demodulation reference signal (DMRS) symbols may be aligned, and different code-division multiplexing (CDM) groups may be used to differentiate the two PDSCHs 210.

Additionally, for monitoring the DCIs transmitted on the PDSCHs 210 from the different base stations 105, each base station 105 may use different control resource sets (CORESETs). In some cases, UE 115-a may support a maximum of five (5) CORESETs. Accordingly, UE 115-a may differentiate the base stations 105 (e.g., TRPs) based on a corresponding CORESET group for each base station 105 (e.g., as indicated by a CORESET ID). Additionally, a higher layer signaling index per CORESET may be defined which can group the CORESETs into two (2) groups (e.g., via an index=0 and an index=1). For example, base station 105-a may use a CORESET group index 0 (e.g., a first CORESET ID) for transmitting PDCCH 205-a and PDSCH 210-a, and base station 105-b may use a CORESET group index 1 (e.g., a second CORESET ID) for transmitting PDCCH 205-b and PDSCH 210-b. Additionally or alternatively, different (e.g., other) base stations 105 may be transparent to UE 115-a.

In some cases, UE 115-a may transmit ACK feedback (e.g., HARQ-ACK feedback) corresponding to PDSCHs 210-a and 210-b scheduled by base station 105-a and 105-b, respectively, on a single PUCCH 215. For example, UE 115-a may transmit a joint ACK/NACK (A/N) feedback message (e.g., carried on the single PUCCH 215) for both PDSCHs 210-a and 210-b. Accordingly, UE 115-a may use a same codebook for encoding and transmitting the joint A/N feedback message (e.g., on the same PUCCH 215). Additionally or alternatively, UE 115-a may transmit separate A/N feedback messages on respective PUCCHs to each base station 105. For example, as shown, UE 115-a may transmit PUCCH 215 to base station 105-a (e.g., first TRP) and a PUCCH 220 to base station 105-b (e.g., second TRP), such that the A/N feedback is carried on separate PUCCHs. Additionally, UE 115-a may transmit PUCCH 215 (e.g., a first PUCCH) with a first beam and/or a first set of power control parameters and may transmit PUCCH 220 (e.g., a second PUCCH) with a second beams and/or second set of power control parameters. Accordingly, if the separate A/N feedback messages are transmitted in a same slot (e.g., or different length TTI), a codebook used for encoding and transmitting the separate A/N feedback messages may be separated based on a CORESET group (e.g., as indicated by the CORESET group index as described above) in which the corresponding DCI scheduling the respective PDSCH 210 is received in the associated PDCCH 205.

In some cases, one PUCCH 215 may correspond to multiple PDSCHs 210 from multiple TRPs from a same base station 105, different base stations 105, etc. Additionally or alternatively, UE 115-a may transmit multiple PUCCHs (e.g., PUCCH 215 and PUCCH 220) corresponding to each PDSCH 210, TRP, base station 105, etc. Base station 105-a may be a serving base station 105 for UE 115-a, and UE 115-*a* may transmit PUCCH 215 (e.g., or multiple PUCCHs 215 and 220) to base station 105-*a* based on the serving base station designation. Alternatively, as described above and as shown, UE 115-*a* may transmit the multiple PUCCHs to the respective base stations 105 from which the PDSCHs 210 (e.g., and corresponding PDCCHs 205) are received (e.g., PUCCH 215 to base station 105-*a* from which PDSCH 210-*a* is received and PUCCH 220 to base station 105-*b* from which PDSCH 210-*b* is received).

Additionally, the capability of receiving the multiple DCIs from the multiple base stations 105 (e.g., base stations 105-*a* and 105-*b*) may be supported by UEs 115 operating in a first radio access technology (RAT) (e.g., enhanced mobile broadband (eMBB) communications). In some cases, the use of the multiple DCIs may be used for increasing reliability. For example, the two DCIs may schedule the two corresponding PDSCHs 210 containing a same TB to increase chances that the TB is fully received and decoded by UE 115-*a*. In some cases, same or different redundancy versions (RVs) may be used for the TB in each PDSCH 210. Additionally, the two PDSCHs 210 may be spatial division multiplexed (SDMed), frequency division multiplexed (FDMed), and/or time division multiplexed (TDMed). In some cases, the two PDSCHs 210 may also or alternatively be partially overlapping in the frequency and/or time domains.

Accordingly, UE 115-*a* and the base stations 105 may determine that the TB is successfully transmitted and decoded as long as one pair of the first DCI and PDSCH 210-*a* (e.g., the pair of DCI1 and PDSCH1) or the second DCI and PDSCH 210-*b* (e.g., the pair of DCI2 and PDSCH2) is decoded by UE 115-*a*. For example, UE 115-*a* may identify if at least one of the DCI/PDSCH pairs is successfully received and decoded based on fully receiving and decoding each downlink message, and base station 105-*a* (e.g., or a separate serving base station 105) may determine if UE 115-*a* received and decoded at least one of the DCI/PDSCH pairs based on the ACK feedback received in PUCCH 215. For PDSCH decoding, UE 115-*a* may or may not use soft combining of the two PDSCHs 210. When no soft combining is used at UE 115-*a*, UE 115-*a* may decode the two PDSCHs 210 individually, even though both PDSCHs 210 contain the same TB. As described herein, with the multiple base stations 105 (e.g., multi-TRP), the different DCIs/PDSCHs may be transmitted from the different base stations 105 (e.g., TRPs). Accordingly, the DCIs may be received on different CORESET groups (e.g., corresponding to a higher layer index configured per CORESET as index=0 and index=1). Additionally, the TRPs may have a same or different physical cell identifiers (PCIs) (e.g., different panels/antenna arrays from a same base station 105 may transmit the different DCIs and corresponding PDSCHs, multiple base stations 105 have a same PCI, etc.). In some cases, reception (e.g., the DCIs/PDSCHs) from the different base stations 105 may be associated with different beams (e.g., transmit beams of the base stations and/or receive beams of UE 115-*a*), transmission configuration indicator (TCI) states of UE 115-*a*, quasi co-location (QCL) relationships, etc.

The techniques as described herein may apply to different DCIs/PDSCHs being transmitted from different panels (e.g., of a same base station 105/TRP) and/or different DCIs/PDSCHs being transmitted with different beams/TCI states (e.g., but from a same base station 105/TRP). For example, with the different beams/TCI states, different DCIs may be received on different CORESET groups or on different CORESETs (e.g., when different CORESET groups are not configured, such that a same CORESET group is used for each DCI with each DCI transmitted/received on a different CORESET of the same CORESET group). In some examples, no restriction on TCI state may be placed on receiving the different DCIs/PDSCH (e.g., each DCI or PDSCH can be transmitted with a same beam as another DCI or PDSCH), and DCIs may be received on a same CORESET.

Figure 3A:
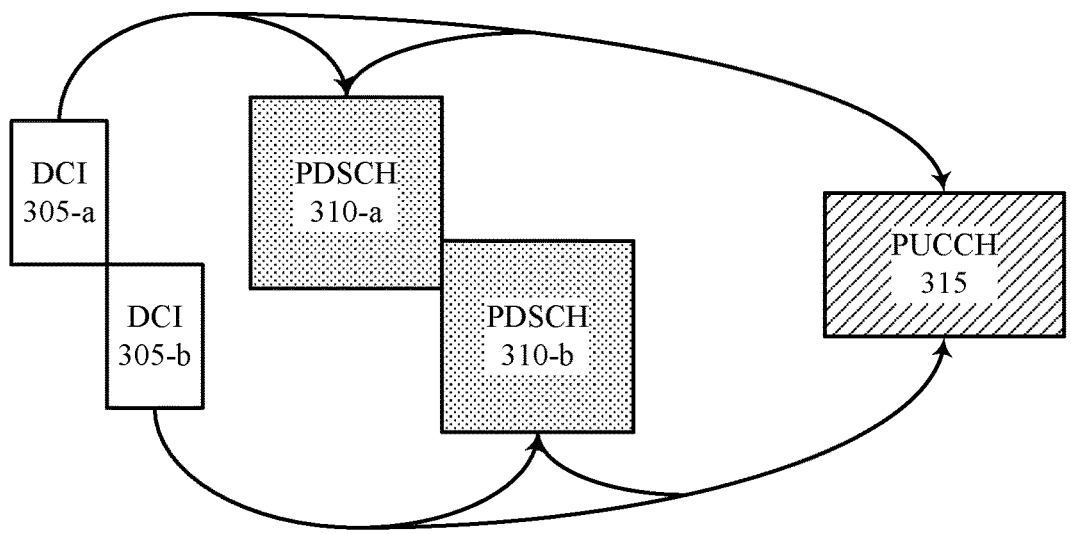
FIGS. 3A and 3B illustrate examples of transport block (TB) processing configurations that support data transmission reliability with multiple DCI signals in accordance with aspects of the present disclosure.
Figure 3B:
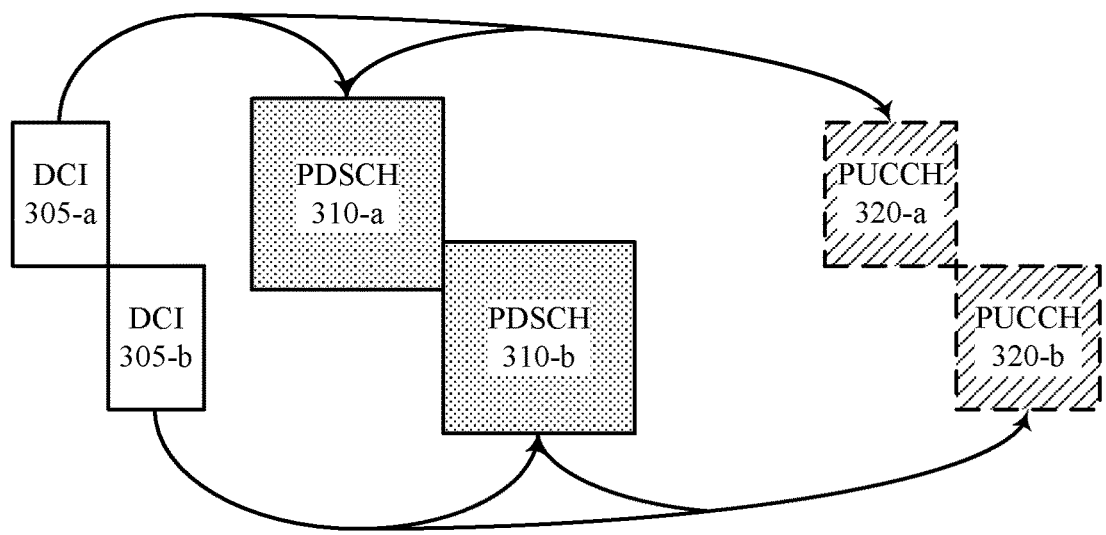

FIGS. 3A and 3B illustrates an example of a TB processing configurations 300 and 301 that support data transmission reliability with multiple DCI signals in accordance with aspects of the present disclosure. In some examples, TB processing configurations 300 and 301 may implement aspects of wireless communications systems 100 and/or 200. A UE 115 may use TB processing configurations 300 and 301 when receiving multiple DCIs 305 scheduling corresponding PDSCHs 310 for a same TB from different base stations 105 (e.g., multi-TRP) and transmitting ACK feedback in one or more PUCCHs based on attempting to decode the TB. For example, as shown in TB processing configuration 300, the UE 115 may transmit a single, joint PUCCH 315 for all PDSCHs 310 and attempting to decode the TB for each PDSCH 310 (e.g., with attempting to combine the PDSCHs 310). Additionally or alternatively, as shown in TB processing configuration 301, the UE 115 may transmit separate PUCCHs 320 corresponding to each PDSCH 310 received and based on attempting to decode the TB in the respective PDSCHs 310.

As an example shown in FIGS. 3A and 3B, the UE 115 may detect and receive a first DCI 305-*a* (e.g., on a CORESET group 1) that includes a HARQ ID of 2 and a new data indicator (NDI) of 1 and a second DCI 305-*b* (e.g., on a CORESET group 2) that includes a HARQ ID of 2 and a NDI of 1. Accordingly, the same HARQ ID and NDI may indicate that the two DCIs correspond to the same TB. Subsequently, each DCI 305 may schedule a corresponding PDSCH 310 (e.g., downlink data channel) for the UE 115 to receive the TB (e.g., downlink messages/data) from the respective base stations 105. For example, DCI 305-*a* may schedule a first PDSCH 310-*a*, and DCI 305-*b* may schedule a second PDSCH 310-*b*. In some cases, the PDSCHs 310 may be SDMed, TDMed, and/or FDMed (e.g., or partially overlapping). Additionally, the UE 115 may be expected to transmit ACK information based on receiving and attempting to decode the DCIs 305 and/or PDSCHs 310. For example, as shown in FIG. 3A, the UE 115 may transmit PUCCH 315 that includes joint ACK feedback for both DCIs 305 and/or PDSCHs 310. Additionally or alternatively, as shown in FIG. 3B, the UE 115 may transmit the separate PUCCHs 320 that correspond to the two DCI/PDSCH pairs (e.g., a first PUCCH 320-*a* may correspond to DCI 305-*a* and PDSCH 310-*a*, and a second PUCCH 320-*b* may correspond to DCI 305-*b* and PDSCH 310-*b*). The UE 115 may identify whether to transmit the joint PUCCH 315 or the separate PUCCHs 320 based on an indication received from a serving base station 105 (e.g., via RRC signaling).

However, in some cases, the UE 115 may not be expected to receive a second PDSCH 310 (e.g., PDSCH 310-*b*) for a given HARQ process until after an end of an expected transmission of ACK information (e.g., HARQ-ACK) for that given HARQ process. Accordingly, the UE 115 may determine an error case occurs if the second PDSCH 310 is received prior to the expected ACK transmission occurring. This error case may apply both for retransmissions (e.g., same HARQ ID with NDI not toggled) or new transmissions (e.g., same HARQ ID with NDI toggled).

As described herein, if the UE 115 indicates (e.g., or identifies) a capability of supporting multiple DCIs 305 (e.g., multi-DCI for reliability), receives DCI 305-a (e.g., first DCI) scheduling PDSCH 310-a (e.g., first PDSCH) with a given HARQ ID (e.g., HARQ ID=2), and receives DCI 305-b (e.g., second DCI) scheduling PDSCH 310-b (e.g., second PDSCH) with the same HARQ ID (e.g., HARQ ID=2) and a value of NDI (e.g., NDI=1) is the same in both DCIs 305 (e.g., indicating both PDSCHs 310 correspond to the same TB), the UE 115 may decode both PDSCHs 310 even if both PDSCHs 310 are received before an expected transmission of ACK information (e.g., HARQ-ACK) in a corresponding PUCCH 315 or PUCCH 320.

Additionally, the UE may perform the above described techniques if the two DCIs 305 are received in different CORESET groups or in different CORESETs (e.g., of a same CORESET group), if a cyclic redundancy check (CRC) of both DCIs 305 are scrambled with a same radio network temporary identifier (RNTI) (e.g., cell RNTIs (C-RNTI), modulation and coding scheme (MCS) C-RNTIs (MCS-C-RNTI), or configured scheduling RNTIs (CS-RNTI) for both DCIs 305), if the UE 115 determines a same TB size (TBS) for the two PDSCHs 310 (e.g., that have the same HARQ ID and NDI) based on scheduling information in the respective DCIs 305 (e.g., number of RBs or symbols, number of layers, MCS, etc.), or a combination thereof. Accordingly, if one or more of the preceding conditions are not satisfied, the UE 115 (e.g., and the base stations 105) may determine the error case occurs (e.g., a different PDSCH 310 for a different TB is received prior to the ACK feedback for a first PDSCH 310).

Figure 4:
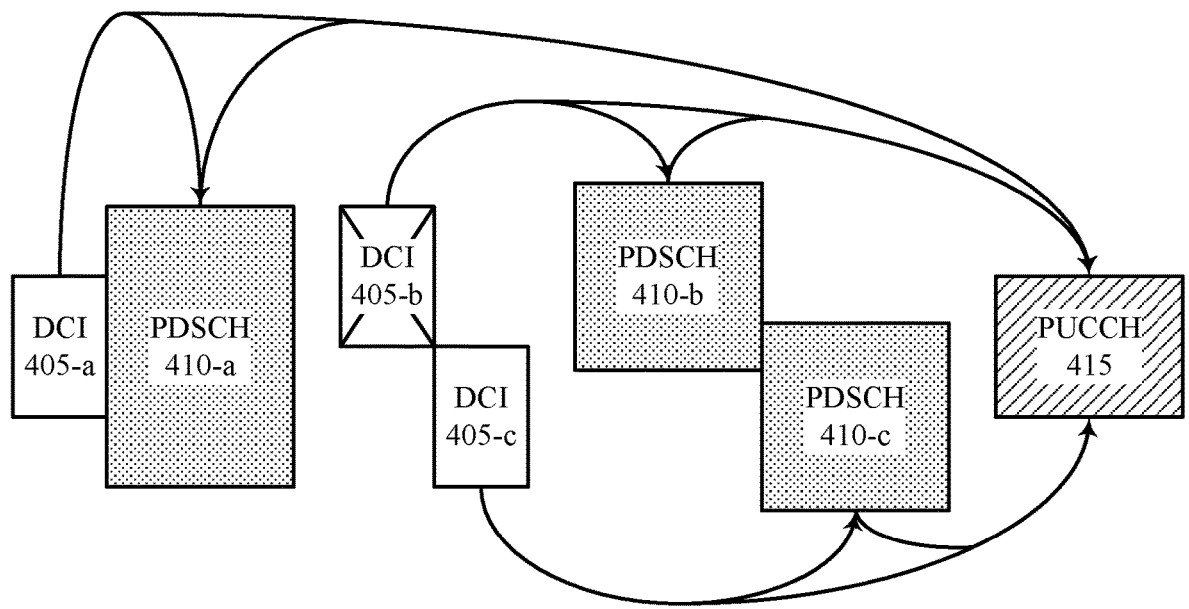
FIGS. 4, 5, and 6 illustrate examples of acknowledgement (ACK) feedback configurations that support data transmission reliability with multiple DCI signals in accordance with aspects of the present disclosure.

FIG. 4 illustrates an example of an ACK feedback configuration 400 that supports data transmission reliability with multiple DCI signals in accordance with aspects of the present disclosure. In some examples, ACK feedback configuration 400 may implement aspects of wireless communications systems 100 and/or 200. A UE 115 may use ACK feedback configuration 400 when receiving multiple DCIs 405 scheduling corresponding PDSCHs 410 for a same TB from different base stations 105 (e.g., multi-TRP) and transmitting ACK feedback in a PUCCH 415 (e.g., or corresponding, separate PUCCHs) based on attempting to decode the TB.

For ACK feedback (e.g., HARQ-ACK feedback) when receiving multiple DCIs 405 (e.g., multi-DCI), a payload of the ACK feedback may depend on that both DCIs 405 schedule a same TB in both cases of joint feedback through one PUCCH resource (e.g., PUCCH 415) or separate feedback on two PUCCH resources. Accordingly, uplink control information (UCI) payload (e.g., payload including the ACK feedback) size may change if one of the DCIs 405 is not detected.

In some cases, the UE 115 may support and have soft combining enabled. As such, in addition to separate A/N feedback per PDSCH 410, combined A/N results with soft combining may also reported. For the joint feedback PUCCH 415, the UE 115 may report A/N feedback for a first PDSCH 410, A/N feedback for a second PDSCH 410, and A/N feedback corresponding to soft combining of both PDSCHs 410 (e.g., A/N feedback for PDSCH 1, A/N feedback for PDSCH 2, and A/N feedback for combined PDSCHs). Additionally or alternatively, for the separate A/N feedback through the two PUCCH resources, the UE 115 may report A/N feedback for the first PDSCH 410 and A/N feedback corresponding to soft combining of both PDSCHs 410 (e.g., A/N feedback for PDSCH 1 and A/N feedback for combined PDSCHs) using the first PUCCH resource and may report A/N feedback for the second PDSCH 410 and A/N feedback corresponding to soft combining of both PDSCHs 410 (e.g., A/N feedback for PDSCH 2 and A/N feedback for combined PDSCHs) using the second PUCCH resource.

Additionally or alternatively, the UE may signal a best beam index along with the A/N results (e.g., as part of the HARQ-ACK codebook). For the joint feedback PUCCH 415, the UE 115 may report A/N feedback for the first PDSCH 410, A/N feedback for the second PDSCH 410, and the best beam index (e.g., A/N feedback for PDSCH 1, A/N feedback for PDSCH 2, and best beam index). Additionally or alternatively, for the separate A/N feedback through the two PUCCH resources, the UE 115 may report A/N feedback for the first PDSCH 410 and the best beam index (e.g., A/N feedback for PDSCH 1 and best beam index) using the first PUCCH resource and may report A/N feedback for the second PDSCH 410 and the best beam index (e.g., A/N feedback for PDSCH 2 and best beam index) using the second PUCCH resource.

In the absence of an indication of a capability of supporting multiple DCIs 405 (e.g., multi-DCI for PDSCH reliability), such dependency may not exist (e.g., a number of HARQ-ACK bits per PDSCH is not a function of if another PDSCH is sent). Accordingly, in the absence of such dependency (e.g., number of HARQ-ACK bits per PDSCH is not a function of this mode of operation), the UE 115 may transmit A/N bits corresponding to individual PDSCH decoding, or the first A/N bit may correspond to the first PDSCH 410 and the second A/N bit may correspond to the combined results, or both the first and second A/N bits may correspond to the combined results (e.g., one bit per PDSCH in all examples).

Additionally or alternatively, for a dynamic HARQ-ACK codebook (e.g., type 2 codebook), if DCI(s) 405 in a last PDCCH monitoring occasion (e.g., time resources allocated for a base station 105 to transmit and for the UE 115 to monitor for and receive a PDCCH/DCI 405) are missed before the expected ACK feedback transmission (e.g., in PUCCH 415), the UE 115 may be unable to detect the missing DCI(s) 405 through downlink assignment index (DAI) mechanisms. Accordingly, HARQ-ACK codebook size mismatch issues may arise. Given that for the capability of supporting multiple DCIs 405 (e.g., multi-DCI for PDSCH reliability), network devices (e.g., base stations 105) may determine that a second DCI 405 scheduling the same TB will be sent, thereby offering an opportunity for correcting the HARQ-ACK codebook size mismatch issue.

As an example shown in FIG. 4, a first DCI 405-a (e.g., DCI0) may include a HARQ ID of 1, an NDI of 1, and a counter DAI (c-DAI) of 1 (e.g., HARQ ID=1, NDI=1, c-DAI=1), a second DCI 405-b (e.g., DCI1) may include a HARQ ID of 2, an NDI of 1, and a c-DAI of 2 (e.g., HARQ ID=2, NDI=1, c-DAI=2), and a third DCI (e.g., DCI2) may include a HARQ ID of 2, an NDI of 1, and a c-DAI of 3 (e.g., HARQ ID=2, NDI=1, c-DAI=3). Further, each DCI 405 may schedule a PDSCH 410 for the UE 115 to receive a TB. For example, DCI 405-a may schedule a first PDSCH 410-a with a first TB (e.g., conventional DCI and PDSCH), DCI 405-b may schedule a second PDSCH 410-b with a second TB, and DCI 405-c may schedule a third PDSCH 410-c with the second TB (e.g., as indicated by the same HARQ ID and NDI). Accordingly, the UE 115 may then transmit PUCCH 415 based on attempting to decode each PDSCH 410. The c-DAIs may represent an incremental counter for each DCI 405 that the base stations 105 transmit (e.g., including the conventional DCI 405-a as well as the multi-DCIs 405-b and 405-c). Additionally or alternatively, the base stations 105 may configure separate c-DAIs for each type of DCI (e.g., a first incremental c-DAI for conventional DCIs and a second incremental c-DAI for multi-DCIs).

In some cases, a number of bits in PUCCH 415 for HARQ-ACK per PDSCH occasion (e.g., for a semi-static or type 1 codebook) or per DAI (e.g., for a type 2 codebook) is increased to a largest possible payload (e.g., constant payload increase when UE is configured with this type of operation) so that missing DCIs may not impact the codebook size. This constant payload size (e.g., dependent on the number of DCIs transmitted) may apply for both a joint PUCCH 415 and for separate PUCCH resources as described above for transmitting the ACK feedback, as well as for both type 1 and type 2 codebooks. For a regular ACK feedback, such as for a regular DCI/PDSCH (e.g., DCI 405-a and PDSCH 410-a not scheduling/corresponding to the second TB) or for a missing DCI 405 in a HARQ-ACK reporting, the UE 115 may set the unused HARQ-ACK bits to NACK or '0' (e.g., or sets all bits to NACK or '0' in case of missing DCI).

Table 1 below shows an example of the ACK feedback transmitted in PUCCH 415 (e.g., joint PUCCH) for the case of dynamic HARQ-ACK codebook (e.g., type 2) if no DCIs 405 are missed and/or if DCI 405-b is missed using a type 2 codebook (e.g., dynamic, DAI-based codebook). Based on the constant payload size, each DAI may include three (3) bits (e.g., and based on whether DCIs 405 are part of multi-DCI for PDSCH reliability or not).

missed DCI 505 corresponds to a DCI 505 scheduling the same TB. If combined with the process as described above with reference to FIG. 4, the UE 115, upon detecting that a DCI 505 is missed, may set all the bits in the HARQ-ACK codebook corresponding to the missing DCI(s) 505 to NACK or '0.'.

Figure 5:
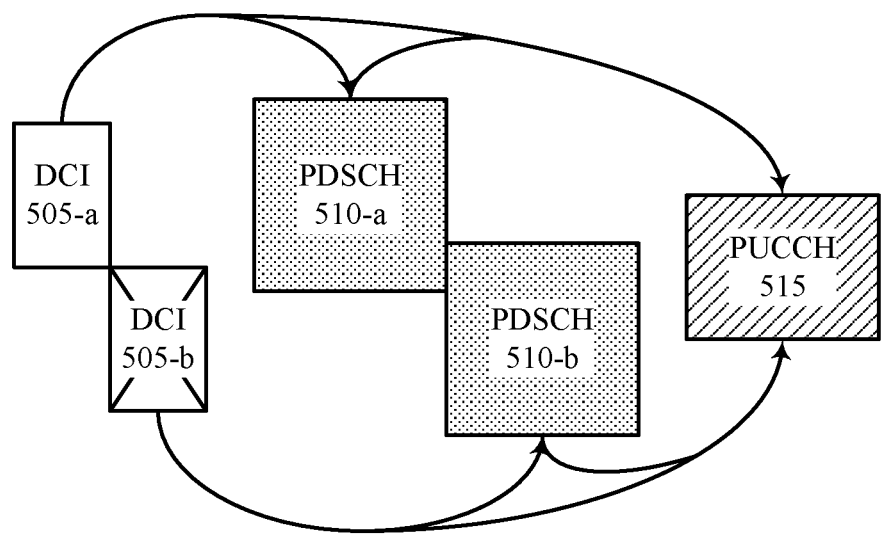

As an example shown in FIG. 5, a first DCI 505-a (e.g., DCI0) may include a HARQ ID of 2, an NDI of 1, a c-DAI of 1, and a t-DAI of 2 (e.g., HARQ ID=2, NDI=1, (c-DAI, tDAI)=(1, 2)) and a second DCI 505-b (e.g., DCI1) may include a HARQ ID of 2, an NDI of 1, a c-DAI of 2, and a t-DAI of 2 (e.g., HARQ ID=2, NDI=1, (c-DAI, tDAI)=(2, 2)). Further, each DCI 505 may schedule a PDSCH 510 for the UE 115 to receive a TB. For example, DCI 505-a may schedule a first PDSCH 510-a with the TB and DCI 505-b may schedule a second PDSCH 510-b with the TB (e.g., as indicated by the same HARQ ID and NDI). Accordingly, the UE 115 may then transmit PUCCH 515 based on attempting to decode each PDSCH 510. As shown, DCI 505-b may be missed by the UE 115 (e.g., not successfully received and/or decoded), but because t-DAI in DCI 505-a also counts DCI 505-b to be sent later (e.g., in a different PDCCH monitoring occasion), the UE 115 may determine that there is a missing DCI 505 (e.g., and can place dummy NACK(s) in the corresponding place in the codebook). The c-DAIs may represent an incremental counter of the multi-DCIs (e.g., DCIs 505-a and 505-b) transmitted by the base station 105 in relation to the t-DAI and may not take into account

TABLE 1

| ACK information in PUCCH | | | |
|---|---|---|---|
| | DAI = 1 | DAI = 2 | DAI = 3 |
| No DCIs missed | (A/N feedback for PDSCH410-a, NACK, NACK) | (A/N feedback for PDSCH 410-b, A/N feedback for PDSCH 410-c, A/N feedback for combined PDSCHs 410-b and 410-c) | (A/N feedback for PDSCH 410-c, A/N feedback for PDSCH 410-b, A/N feedback for combined PDSCHs 410-band 410-c) |
| DCI 405-b missed | (A/N feedback for PDSCH410-a NACK, NACK) | (NACK, NACK, NACK) | (A/N feedback for PDSCH 410-c, NACK, NACK) |

FIG. 5 illustrates an example of an ACK feedback configuration 500 that supports data transmission reliability with multiple DCI signals in accordance with aspects of the present disclosure. In some examples, ACK feedback configuration 500 may implement aspects of wireless communications systems 100 and/or 200. A UE 115 may use ACK feedback configuration 500 when receiving multiple DCIs 505 scheduling corresponding PDSCHs 510 for a same TB from different base stations 105 (e.g., multi-TRP) and transmitting ACK feedback in a PUCCH 515 (e.g., or corresponding, separate PUCCHs) based on attempting to decode the TB.

Additionally or alternatively to the process described above with reference to FIG. 4, a total DAI (t-DAI) may be incremented for both DCIs 505 even if the DCIs 505 are transmitted in different PDCCH monitoring occasions with each DCI 505 including a c-DAI number corresponding to the t-DAI. This option may apply to a type 2 (e.g., dynamic) codebook and joint feedback transmission (e.g., as DAI operation is separate for the separate PUCCH resource feedback transmission). In some cases, the UE 115 may detect if a last DCI 505 was missed but may not know if the conventional DCIs transmitted by the base station 105 (e.g., for a different TB, a retransmission of the same TB, etc.)

Figure 6:
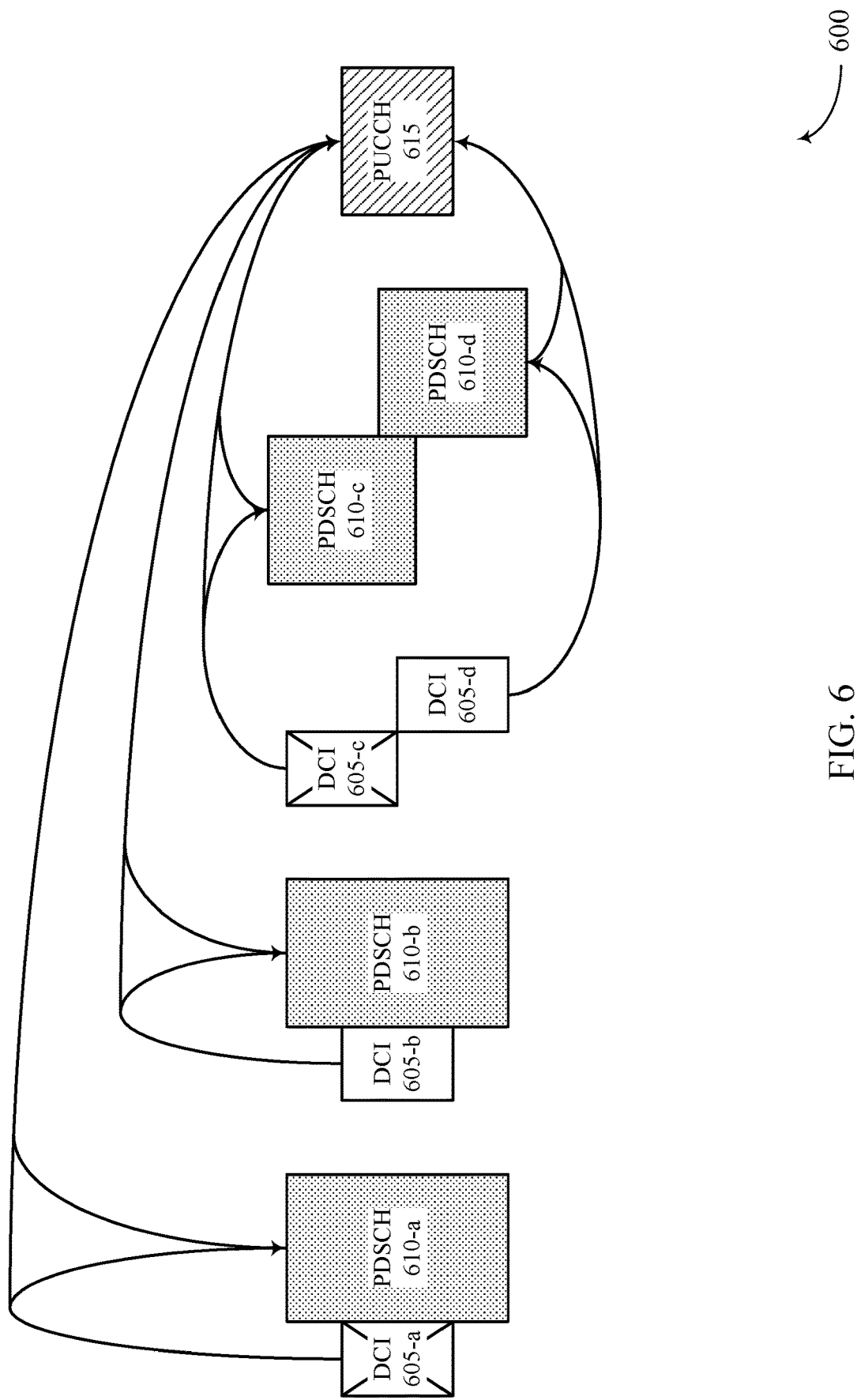

FIG. 6 illustrates an example of an ACK feedback configuration 600 that supports data transmission reliability with multiple DCI signals in accordance with aspects of the present disclosure. In some examples, ACK feedback configuration 600 may implement aspects of wireless communications systems 100 and/or 200. A UE 115 may use ACK feedback configuration 600 when receiving multiple DCIs 605 scheduling corresponding PDSCHs 610 for a same TB (e.g., multi-DCI for PDSCH reliability) from different base stations 105 (e.g., multi-TRP) and transmitting ACK feedback in a PUCCH 615 (e.g., or corresponding, separate PUCCHs) based on attempting to decode the TB.

Additionally or alternatively to the processes described above with reference to FIGS. 4 and 5, a bit in a particular DCI 605 may convey information that the DCI 605 will be followed or was followed by another DCI 605 scheduling the same TB (e.g., and both PDSCHs 610 are received before the corresponding HARQ-Ack feedback in PUCCH 615). This process may apply to a type 2 codebook as codebook size depends on information in the DCIs 605.

Additionally, the process may apply to the joint feedback case. The bit may be a new field in the DCI 605 or may be a repurposed bit of the existing fields. In some cases, for a regular DCI (e.g., not part of multi-DCI for PDSCH reliability), the bit may be set to '0.' For the DCIs 605 that are part of the multi-DCI for PDSCH reliability, the bit may be set to '1.'.

Accordingly, if the UE 115 detects a first DCI 605 with the value of the bit equal to '1' but does not detect a second DCI 605 with the value of the bit equal to '1' (e.g., before the HARQ-ACK reporting for the first PDSCH 610) with a same HARQ ID and NDI, the UE 115 may detect that one of the DCIs 605 of the multi-DCI for PDSCH reliability is missed. Additionally, no extra bits for regular DCIs may be added. If at least one of the two DCIs 605 for the multi-DCI for PDSCH reliability is detected, the codebook size may be determined to be correct. This option may assume that the probability that both DCIs 605 for the multi-DCI for PDSCH reliability are missed is small.

For a DAI operation (e.g., including c-DAI and t-DAI), the UE 115 may increment the c-DAI in different ways. For example, the DAI counting may be separate among the regular DCIs and DCIs that are part of the multi-DCI for PDSCH reliability scheme, where different sub-codebooks may be included in the HARQ-ACK codebook. Additionally, for the DCIs that are part of the multi-DCI for PDSCH reliability scheme scheduling the same TB, DAI may be incremented. Additionally or alternatively, a joint DAI may be configured among the regular DCIs and the DCIs that are part of the multi-DCI for PDSCH reliability scheme, where DAI is not incremented for the second DCI of the multi-DCI for PDSCH reliability scheme (e.g., using one place in the codebook). In this case, the DAI value in the second DCI may be the same as the first DCI. Additionally or alternatively, for the joint DAI among the regular DCIs and the DCIs that are part of the multi-DCI for PDSCH reliability scheme, DAI may be incremented for the second DCI of the multi-DCI for PDSCH reliability scheme (e.g., using two places in the codebook).

As an example shown in FIG. 6, a first DCI 605-a (e.g., DCI0) may include a HARQ ID of 1, an NDI of 1, a c-DAI of 1, and a multi-DCI flag (e.g., the bit added to the DCI as described above) of 0 (e.g., HARQ ID=1, NDI=1, c-DAI=1, and multi-DCI flag=0), a second DCI 405-b (e.g., DCI1) may include a HARQ ID of 4, an NDI of 0, a c-DAI of 2, and a multi-DCI flag of 0 (e.g., HARQ ID=4, NDI=0, c-DAI=2, and multi-DCI flag=0), a third DCI 605-c (e.g., DCI2) may include a HARQ ID of 2, an NDI of 1, a c-DAI of 1, and a multi-DCI flag of 1 (e.g., HARQ ID=2, NDI=1, c-DAI=1, and multi-DCI flag=1), and a fourth DCI 605-d (e.g., DCI3) may include a HARQ ID of 2, an NDI of 1, a c-DAI of 2, and a multi-DCI flag of 1 (e.g., HARQ ID=2, NDI=1, c-DAI=2, and multi-DCI flag=1). Further, each DCI 605 may schedule a PDSCH 610 for the UE 115 to receive a TB. For example, DCI 605-a may schedule a first PDSCH 610-a with a first TB (e.g., conventional DCI and PDSCH), DCI 605-b may schedule a second PDSCH 610-b with a second TB (e.g., conventional DCI and PDSCH), DCI 605-c (e.g., multi-DCI) may schedule a third PDSCH 610-c with a third TB, and DCI 605-d (e.g., multi-DCI) may schedule a fourth PDSCH 610-d with the third TB (e.g., as indicated by the same HARQ ID and NDI). Accordingly, the UE 115 may then transmit PUCCH 615 based on attempting to decode each PDSCH 610. The c-DAIS may represent an incremental counter for each DCI 605 that the base stations 105 transmit (e.g., including the conventional DCIs 605-a and 605-b as well as the multi-DCIs 605-c and 605-d). Additionally or alternatively, the base stations 105 may configure separate c-DAIs for each type of DCI (e.g., a first incremental c-DAI for conventional DCIs 605-a and 605-b and a second incremental c-DAI for multi-DCIs 605-c and 605-d).

Table 2 below shows an example of the ACK feedback transmitted in PUCCH 615 (e.g., joint PUCCH) if no DCIs 405 are missed, if DCI 605-c is missed, and/or if DCIs 605-a and 605-c are both missed using a type 2 codebook (e.g., dynamic, DAI-based codebook). Additionally, the type 2 codebook may include a sub-codebook for the regular DCIs (e.g., DCIs 605-a and 605-b) and a sub-codebook for the multi-DCIs (e.g., DCIs 605-c and 605-d). Note that for the joint DAI, if both DCIs 605-a and 605-c are missed, the UE 115 may see c-DAI=4 (e.g., when DAI is incremented for the second DCI of the multi-DCI for PDSCH reliability scheme) or c-DAI=3 (e.g., DAI is not incremented for the second DCI of the multi-DCI for PDSCH reliability scheme) in DCI 605-d. That is, the UE 115 may determine that two DCIs 605 are missed but does not know which of the two missing DCIs 605 have multi-DCI flag on.

TABLE 2

ACK information in PUCCH

| | Sub-Codebook for Regular DCIs | | Sub-Codebook for Multi-DCIs (DAI = 1, DAI = 2) |
|---|---|---|---|
| | DAI = 1 | DAI = 2 | for same TB |
| No DCIs missed | (A/N feedback for PDSCH 610-a) | (A/N feedback for PDSCH 610-b) | (A/N feedback for PDSCH 610-c, A/N feedback for PDSCH 610-d, A/N feedback for combined PDSCHs 610-c and 610-d) |
| DCI 605-c missed | (A/N feedback for PDSCH 610-a) | (A/N feedback for PDSCH 610-b) | (NACK, A/N feedback for PDSCH 610-d, NACK) |
| DCI 605-a and DCI 605-c missed | (NACK) | (A/N feedback for PDSCH 610-b) | (NACK, A/N feedback for PDSCH 610-d, NACK) |

Figure 7:
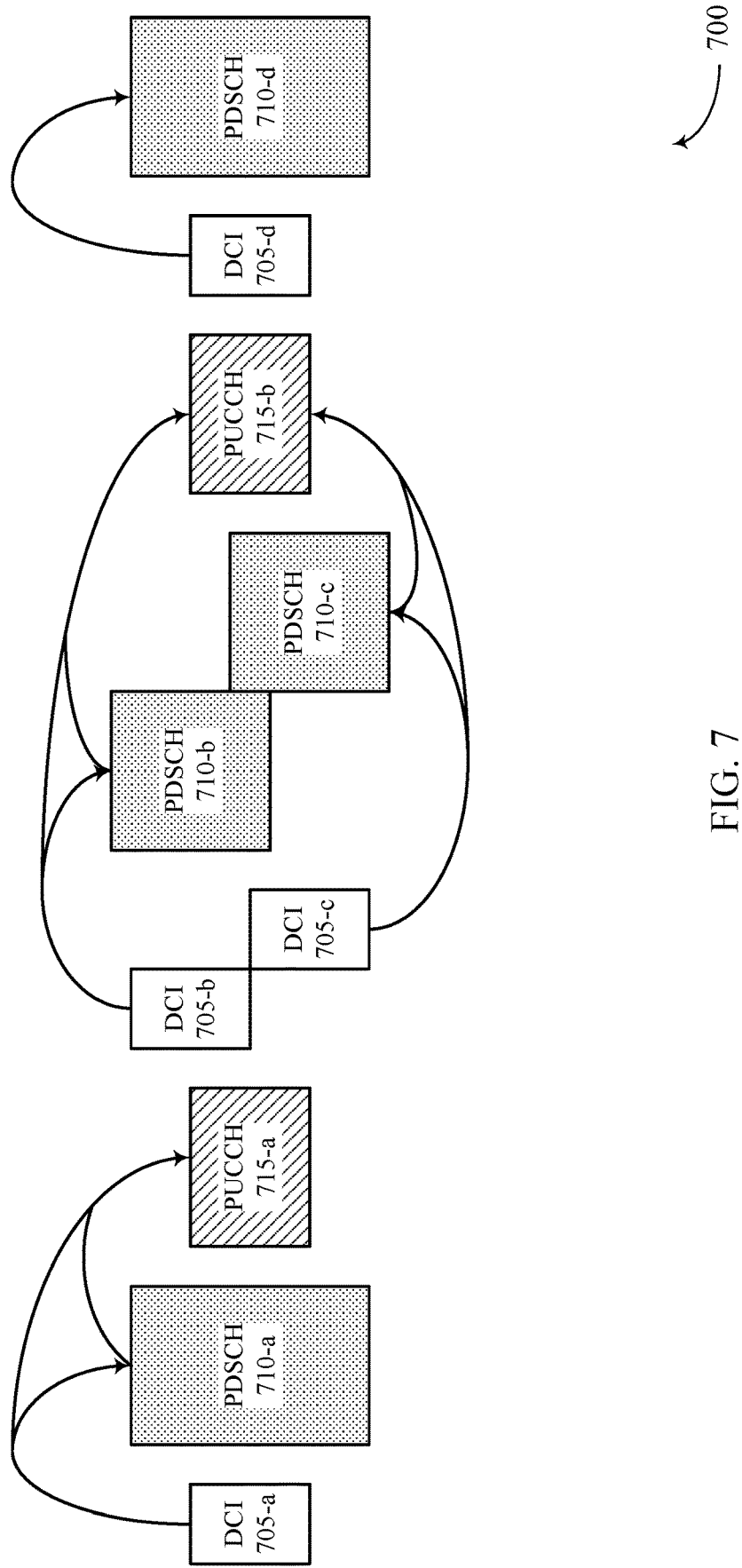
FIG. 7 illustrates an example of a retransmission combination procedure that supports data transmission reliability with multiple DCI signals in accordance with aspects of the present disclosure.

FIG. 7 illustrates an example of a retransmission combination procedure 700 that supports data transmission reliability with multiple DCI signals in accordance with aspects of the present disclosure. In some examples, retransmission combination procedure 700 may implement aspects of wireless communications systems 100 and/or 200. A UE 115 may use retransmission combination procedure 700 when receiving multiple DCIs 705 scheduling corresponding PDSCHs 710 for a same TB from different base stations 105 (e.g., multi-TRP) and transmitting ACK feedback in a PUCCH 715 (e.g., or corresponding, separate PUCCHs) based on attempting to decode the TB. In retransmission combination procedure 700, the UE 115 may be not cable of soft combining (e.g., multi-DCI without soft combining). For example, the UE 115 may not indicate a capability for soft combining.

As an example shown in FIG. 7, a first DCI 705-a (e.g., DCI0) may include a HARQ ID of 2 and an NDI of 1 (e.g., HARQ ID=2, NDI=1), a second DCI 705-b (e.g., DCI1 on a CORESET group 1) may include a HARQ ID of 2 and an NDI of 1 (e.g., HARQ ID=2, NDI=1), a third DCI 705-c (e.g., DCI2 on a CORESET group 2) may include a HARQ ID of 2 and an NDI of 1 (e.g., HARQ ID=2, NDI=1), and a fourth DCI 705-d (e.g., DCI3) may include a HARQ ID of 2 and an NDI of 1 (e.g., HARQ ID=2, NDI=1). Further, each DCI 705 may schedule a PDSCH 710 for the UE 115 to receive a TB. For example, DCI 705-a may schedule a first PDSCH 710-a with the TB, DCI 705-b (e.g., multi-DCI) may schedule a second PDSCH 710-b with the TB (e.g., as indicated by the same HARQ ID and NDI), DCI 705-c (e.g., multi-DCI) may schedule a third PDSCH 610-c with the TB, and DCI 705-d (e.g., multi-DCI) may schedule a fourth PDSCH 710-d with the TB (e.g., as indicated by the same HARQ ID and NDI). However, the TB in PDSCH 710-a, the TB in PDSCHs 710-b and 710-c, and the TB in PDSCH 710-d may be retransmissions of the same TB. Accordingly, the UE 115 may then transmit a first PUCCH 715-a for PDSCH 710-a, a second PUCCH 715-b for PDSCHs 710-b and 710-c, and a third PUCCH 715 (not shown) for PDSCH 710-d based on attempting to decode each, respective PDSCH 710.

In some cases, both DCIs 705-b and 705-c may correspond to a retransmission (e.g., same TB was scheduled before and A/N feedback already transmitted, such as DCI 705-a/PDSCH 710-a in FIG. 7). Accordingly, the UE 115 may combine PDSCH 710-a with PDSCH 710-b and may separately combine PDSCH 710-a with PDSCH 710-c. Additionally or alternatively, the UE 115 may combine PDSCH 710-a with PDSCH 710-b if DCI 705-a is transmitted in a same CORESET group (e.g., in different CORESETs of the same CORESET group) or a same CORESET as DCI 705-b, and the UE 115 may combine PDSCH 710-a with PDSCH 710-c if DCI 705-a is transmitted in a same CORESET group/CORESET as DCI 705-c. Additionally or alternatively, among PDSCH 710-b and PDSCH 710-c, soft combining with PDSCH 710-a may be applied to either the latest PDSCH 710 (e.g., PDSCH 710-c) or the earliest PDSCH 710 (e.g., PDSCH 710-b). In some cases, the soft combining with PDSCH 710-a may be applied to the PDSCH 710 that is scheduled in a lower or higher CORESET ID (e.g., CORESET group index).

Additionally or alternatively, the UE 115 may not decode either of the PDSCHs 710-b or 710-c, and, after transmitting the corresponding HARQ-ACK in PUCCH 715-b, the UE 115 may receive DCI 705-d scheduling the same TB (e.g., through regular HARQ retransmission procedure, such as DCI 705-d/PDSCH 710-d as shown in FIG. 7). Accordingly, the UE 115 may combine PDSCH 710-d with both PDSCHs 710-b or 710-c. Additionally or alternatively, the UE 115 may combine PDSCH 710-d with PDSCH 710-b if DCI 705-d is transmitted in a same CORESET group/CORESET as DCI 705-b, and/or the UE 115 may combine PDSCH 710-d with PDSCH 710-c if DCI 705-d is transmitted in the same CORESET group/CORESET as DCI 705-c. Additionally or alternatively, the UE 115 may combine PDSCH 710-d to either the latest PDSCH 710 (e.g., PDSCH 710-c) or the earliest PDSCH 710 222(e.g., PDSCH 710-b). In some cases, the soft combining with PDSCH 710-d may be applied to the PDSCH 710 that is scheduled in a lower or higher CORESET ID (e.g., CORESET group index).

Figure 8A:
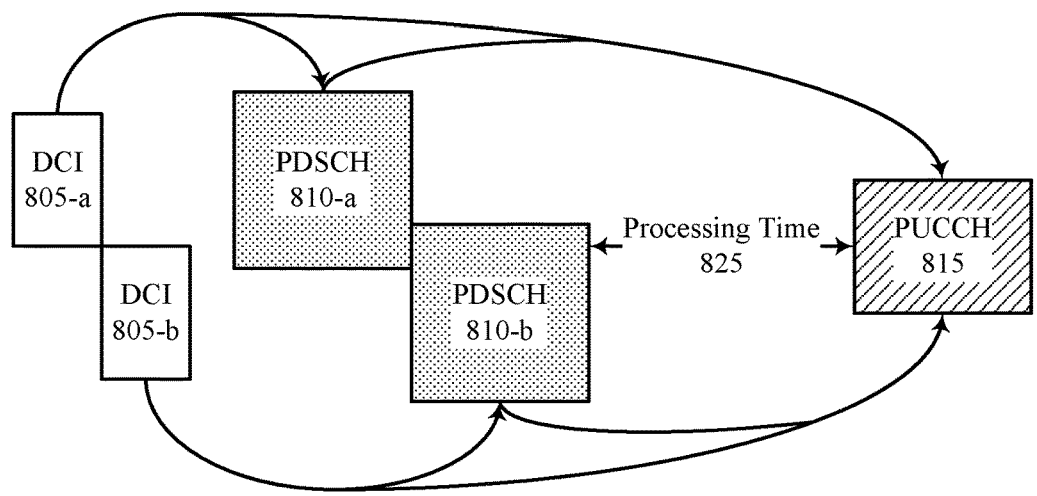
FIGS. 8A, 8B, and 8C illustrate examples of processing timing configurations that support data transmission reliability with multiple DCI signals in accordance with aspects of the present disclosure.
Figure 8B:
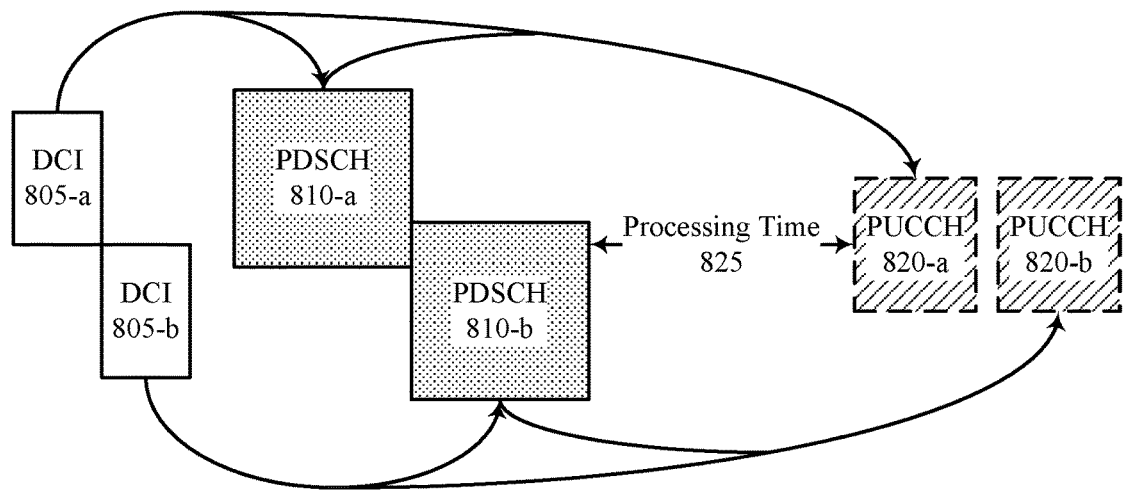
Figure 8C:
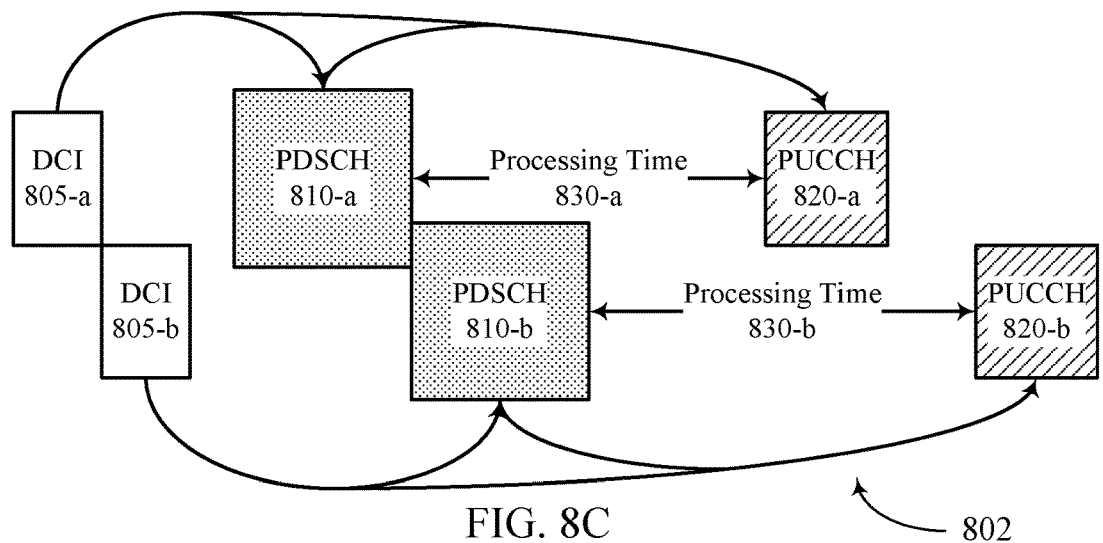

FIGS. 8A, 8B, and 8C illustrate examples of a processing timing configurations 800, 801, and 802 that support data transmission reliability with multiple DCI signals in accordance with aspects of the present disclosure. In some examples, processing timing configurations 800, 801, and 802 may implement aspects of wireless communications systems 100 and/or 200. A UE 115 may use processing timing configurations 800, 801, and 802 when receiving multiple DCIs 805 scheduling corresponding PDSCHs 810 for a same TB from different base stations 105 (e.g., multi-TRP) and transmitting ACK feedback in one or more PUCCHs based on attempting to decode the TB. For example, for processing timing configurations 800, the UE 115 may transmit a single, joint PUCCH 815 for all PDSCHs 810 and attempting to decode the TB for each PDSCH 810 (e.g., and attempting to combine the PDSCHs 810). Additionally or alternatively, as shown in processing timing configurations 801 and 802, the UE 115 may transmit separate PUCCHs 820 corresponding to each PDSCH 810 received and based on attempting to decode the TB in the respective PDSCHs 810.

Conventionally, a PDSCH processing timing may be a minimum time between an end of a PDSCH 810 to the start of HARQ-ACK feedback (e.g., in PUCCH 815 or PUCCHs 820) and may be calculated as $N_1 + d_{1,1}$ in terms of number of OFDM symbols. Accordingly, $N_1$ may depend on a UE indicated processing capability (e.g., capability 1 or 2) and subcarrier spacing (SCS). Additionally, $d_{1,1}$ may be an additional factor depending on other factors such as mapping type, number of PDSCH symbols, etc. For the case of multi-DCI with soft combining, and if the UE 115 indicates individual A/N results in addition to an A/N result corresponding to soft combining, the UE 115 may have to perform three decodings (e.g., increasing a time for processing).

As an example shown in FIGS. 8A, 8B, and 8C, a first DCI 805-a (e.g., DCI0 on a CORESET group 1) may include a HARQ ID of 2 and an NDI of 1 (e.g., HARQ ID=2, NDI=1) and a second DCI 805-b (e.g., DCI1 with a separate CORESET group, such as a CORESET group 2) may include a HARQ ID of 2 and an NDI of 1 (e.g., HARQ ID=2, NDI=1). Further, each DCI 805 may schedule a PDSCH 810 for the UE 115 to receive a TB. For example, DCI 805-a (e.g., multi-DCI) may schedule a first PDSCH 810-a with the TB and DCI 805-b (e.g., multi-DCI) may schedule a second PDSCH 810-b with the TB (e.g., as indicated by the same HARQ ID and NDI). Accordingly, the UE 115 may then transmit PUCCH 815 based on attempting to decode each PDSCH 810. In some cases, the UE 115 may transmit a joint PUCCH 815 for both PDSCHs 810 (e.g., as shown in FIG. 8A). Additionally or alternatively, the UE 115 may transmit a first PUCCH 820-a for PDSCH 810-a and a second PUCCH 820-b for PDSCH 810-b (e.g., as shown in FIGS. 8B and 8C).

As shown in FIG. 8A, in some cases, for the joint PUCCH 815, a PDSCH processing time 825 may start from the end of PDSCH 810 (e.g., later PDSCH among the two PDSCHs containing the same TB). Additionally, a minimum processing timing for a given capability may be increased by x symbols due to additional complexity (e.g., PDSCH processing time $825=N_1+d_{1,1}+x$). Additionally or alternatively, as shown in FIG. 8B, for the separate PUCCHs 820, the A/N result corresponding to soft combining may be reported in both HARQ-ACK feedbacks (e.g., PUCCH 820-a and PUCCH 820-b). Additionally, PDSCH processing time 825 may be used for both HARQ-ACK feedbacks.

Additionally or alternatively, as shown in FIG. 8C, the A/N result corresponding to soft combining may be reported for PDSCH 810-b (e.g., the later PDSCH). For the first HARQ-ACK feedback (e.g., PUCCH 820-a), a PDSCH processing time 830-a may start from the end of PDSCH 810-a (e.g., first PDSCH) without the additional increase x (e.g., PDSCH processing time $830\text{-}a=N_1+d_{1,1}$). Alternatively, for the second HARQ-ACK feedback (e.g., PUCCH 820-b), a PDSCH processing time 830-b may start from the end of PDSCH 810-b (e.g., the second PDSCH) with the additional increase x (e.g., PDSCH processing time $830\text{-}b=N_1+d_{1,1}+x$). The value of x can be based on a UE indicated capability (e.g., including x=0). Additionally, the PUCCH 815 and/or PUCCHs 820 may not be the scheduled PUCCH/ a physical uplink shared channel (PUSCH) for carrying HARQ-ACK, but the earliest possible opportunities for transmitting the HARQ-ACK.

Figure 9:
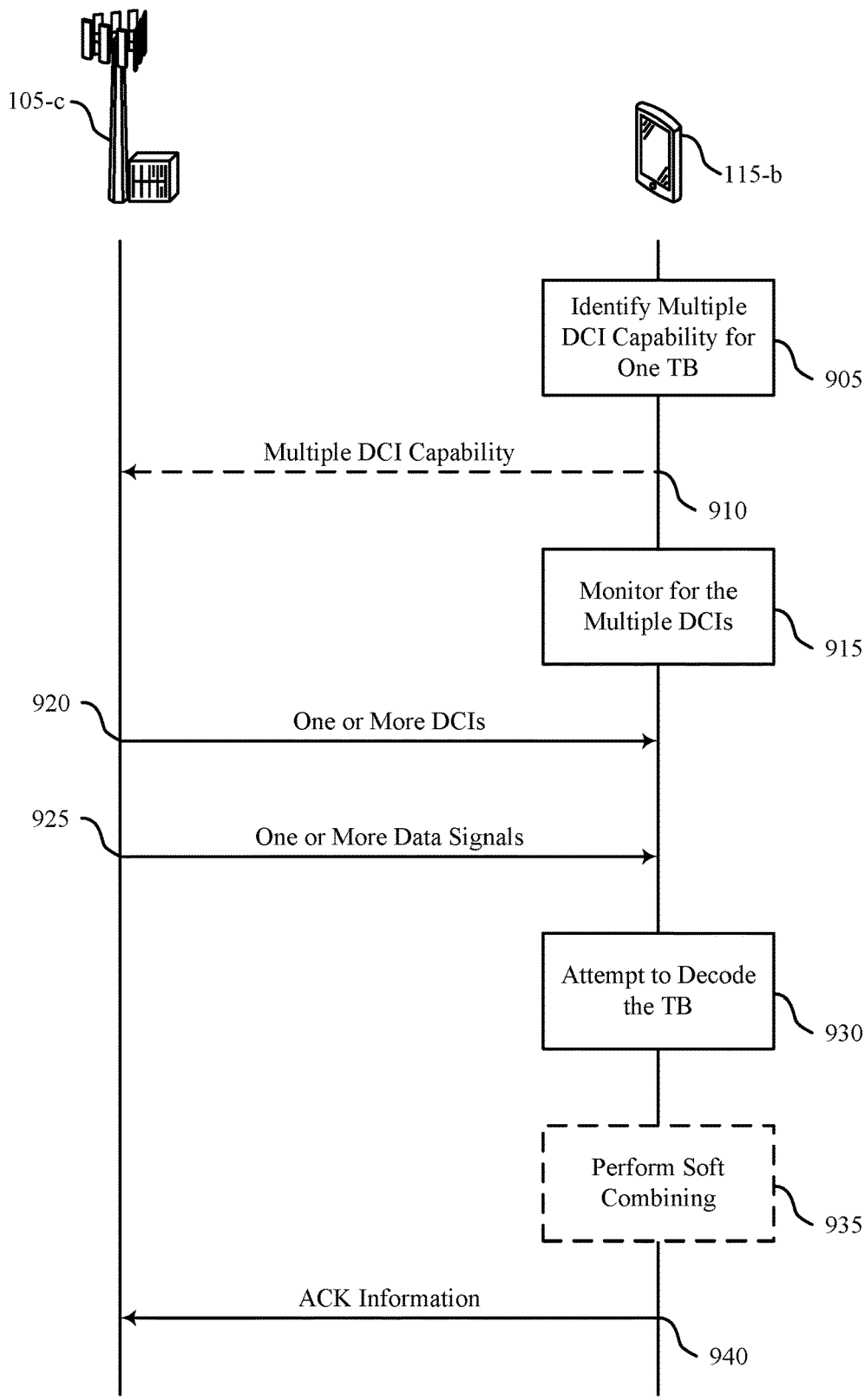
FIG. 9 illustrates an example of a process flow that supports data transmission reliability with multiple DCI signals in accordance with aspects of the present disclosure.

FIG. 9 illustrates an example of a process flow 900 that supports data transmission reliability with multiple DCI signals in accordance with aspects of the present disclosure. In some examples, process flow 900 may implement aspects of wireless communications systems 100 and/or 200. Process flow 900 may include a base station 105-c and a UE 115-b, which may be examples of corresponding base stations 105 and UEs 115, respectively, as described above with reference to FIGS. 1-8C.

In the following description of the process flow 900, the operations between UE 115-b and base station 105-c may be performed in different orders or at different times. Certain operations may also be left out of the process flow 900, or other operations may be added to the process flow 900. It is to be understood that while UE 115-b and base station 105-c are shown performing a number of the operations of process flow 900, any wireless device may perform the operations shown.

At 905, UE 115-b may identify a capability to receive a set of DCIs (e.g., DCI signals, DCI messages, etc.) for a set of data channels for a first TB, the set of DCIs each associated with an ACK information transmission occasion occurring after reception of the set of data channels. In some cases, the set of DCIs may indicate a same HARQ process for the first TB, or a same NDI, or a combination thereof.

At 910, UE 115-b may transmit the identified capability to base station 105-c in a UE capability report. In some cases, the UE capability report may further indicate whether UE 115-b is capable of performing soft combining of the set of data channels. Additionally or alternatively, UE 115-b may transmit an indication of a capability to process one or more of the set of data channels.

At 915, UE 115-b may monitor for the set of DCIs according to the identified capability.

At 920, UE 115-b may receive, from base station 105-c based on the monitoring, one or more DCIs scheduling the first TB. In some cases, UE 115-b may receive a first DCI and a second DCI of the one or more DCIs scheduling the first TB, where a first total DAI for the first DCI counts both the first DCI and the second DCI, and where the first and second DCIs are not monitored in a same downlink channel monitoring occasion (e.g., PDCCH monitoring occasion).

Additionally or alternatively, UE 115-b may receive, from base station 105-c, an indication in a first DCI of the one or more DCIs scheduling the first TB that base station 105-c will transmit a second DCI of the one or more DCIs scheduling the first TB. Accordingly, UE 115-b may separately count a first set of one or more DAIs and a second set of one or more DAIs, where the first set of one or more DAIs are associated with DCIs for a TB for which a single DCI is transmitted and the second set of one or more DAIs are associated with DCIs for a TB for which multiple DCIs are transmitted.

In some cases, UE 115-b may receive, from a first TRP, a first DCI for the first TB in a first CORESET. Additionally, UE 115-b may receive, from a second TRP, a second DCI for the first TB in a second CORESET. In some cases, the first CORESET may be part of a first CORESET group, and the second CORESET may be part of the first CORESET group or a second CORESET group. Additionally or alternatively, UE 115-b may receive a set of DCIs from a set of different TRPs, or a set of different antenna arrays associated with a same TRP, or a set of different transmit beams associated with a same TRP, or a set of different TCI states associated with a same TRP, or a combination thereof.

At 925, UE 115-b may receive a first data signal associated with the first TB and the first DCI and may receive a second data signal associated with the first TB and the second DCI. In some cases, the first data signal may be a retransmission of a previously received data signal associated with the first TB, and the second data signal may also be a retransmission of the previously received data signal associated with the first TB. Additionally, the data channel resources may be SDMed, FDMed, TDMed, partially overlapping, or a combination thereof. In some cases, UE 115-b may receive, from the first TRP, the first TB on data channel resources of a first data channel of the set of data channels. Additionally, UE 115-b may receive, from the second TRP, the first TB on data channel resources of a second data channel of the set of data channels.

At 930, UE 115-b may attempt to decode the first TB on data channel resources of the set of data channels indicated by the received one or more DCIs. In some cases, when receiving a first DCI and a second DCI scheduling the first TB, UE 115-b may determine that a first CRC value of the first DCI is scrambled with a same RNTI as a second CRC value of the second DCI. Additionally, when receiving the first DCI and the second DCI scheduling the first TB, UE 115-b may determine that a first set of scheduling information in the first DCI matches a second set of scheduling information in the second DCI and may attempt to decode a first data signal associated with the first DCI and a second data signal associated with the second DCI based on the determining. In some cases, determining the first set of scheduling information in the first DCI matches the second set of scheduling information in the second DCI may include calculating a TBS based on the first set of scheduling information being the same as a second TBS calculated based on the second set of scheduling information.

At 935, after receiving the first data signal and the second data signal, UE 115-b may perform a soft combining procedure on the data signals. For example, UE 115-b may perform a first soft combining procedure of the received first data signal and the previously received data signal and may perform a second soft combining procedure of the received second data signal and the previously received data signal. Additionally or alternatively, UE 115-b may determine that the previously received data signal was associated with a DCI received in one of the first control resource set or the second control resource set and may perform, based on the determining, a soft combining procedure of the received first data signal and the previously received data signal, or the received second data signal and the previously received data signal. In some cases, UE 115-*b* may perform a soft combining procedure of the received first data signal and the previously received data signal, or the received second data signal and the previously received data signal, based on a selection rule.

At 940, UE 115-*b* may transmit, to base station 105-*c* during the ACK information transmission occasion, ACK information associated with the first TB based on the attempted decoding. In some cases, a payload size of the ACK information may be based on the identified capability of UE 115-*b* to receive the set of DCIs for the set of data channels for the first TB. Additionally, a type of the ACK feedback may be configured as dynamic, and the payload size of the ACK information associated with each DAI is a same size. Alternatively, a type of the ACK feedback may be configured as semi-static, and the payload size of the ACK information associated with each candidate data channel occasion may be a same size.

In some cases, the received one or more DCIs may indicate a same set of resources for transmission of the ACK information. Accordingly, if the UE is capable of soft combining, UE 115-*b* may transmit a first ACK bit, a second ACK bit, and a combined ACK bit in the same set of resources for transmission of the ACK information, where the first ACK bit corresponds to a first data signal for the TB associated with a first of the set of DCIs, the second ACK bit corresponds to a second data signal for the TB associated with a second of the set of DCIs, and the combined acknowledgement bit corresponds to a result of soft combining the first data signal and the second data signal.

Alternatively, the received one or more DCIs may indicate different sets of resources for transmission of the ACK information. Accordingly, if the UE is capable of soft combining, UE 115-*b* may transmit a first ACK bit and a combined ACK bit in a first set of the different sets of resources for transmission of the ACK information and may transmit a second ACK bit and the combined ACK bit in a second set of the different sets of resources for transmission of the ACK information. In some cases, the first ACK bit may correspond to a first data signal for the TB associated with a first of the set of DCIs, the second ACK bit may correspond to a second data signal for the TB associated with a second of the set of DCIs, and the combined ACK bit may correspond to a result of soft combining the first data signal and the second data signal.

In some cases, the ACK information associated with the first TB may include the first ACK bit and the second ACK bit for the first TB, where the first ACK bit is for a first data signal associated with a first of the set of DCIs and the second ACK bit is for a second data signal associated with a second of the set of DCIs. Additionally or alternatively, the ACK information associated with the first TB may include the first ACK bit and the combined ACK bit for the first TB, where the first ACK bit is for a first data signal associated with a first of the set of DCIs, and the combined ACK bit is for a combination of the first data signal and a second data signal associated with a second of the set of DCIs. In some cases, the ACK information associated with the first TB may include a first combined ACK bit and a second combined ACK bit for the first TB, where the first combined ACK bit is for a combination of a first data signal associated with a first of the set of DCIs and a second data signal associated with a second of the set of DCIs and the second combined ACK bit is for the combination of the first data signal and the second data signal.

Additionally, in some cases, UE 115-*b* may receive, after transmitting the ACK information, a third DCI scheduling the first TB and may receive a third data signal associated with the third DCI, where the third data signal is a retransmission of the first TB. Accordingly, UE 115-*b* may perform a first soft combining procedure of the third data signal and the first data signal and may perform a second soft combining procedure of the third data signal and the second data signal. Additionally or alternatively, UE 115-*b* may determine that both the first DCI and the third DCI were received in the first CORESET or a first group of CORESETs (e.g., same CORESET group) that includes at least the first CORESET and may perform, based on the determining, a soft combining procedure of the third data signal and the first data signal. In some cases, UE 115-*b* may perform a soft combining procedure of the third data signal and the first data signal, or the third data signal and the second data signal, based on a selection rule.

Figure 10:
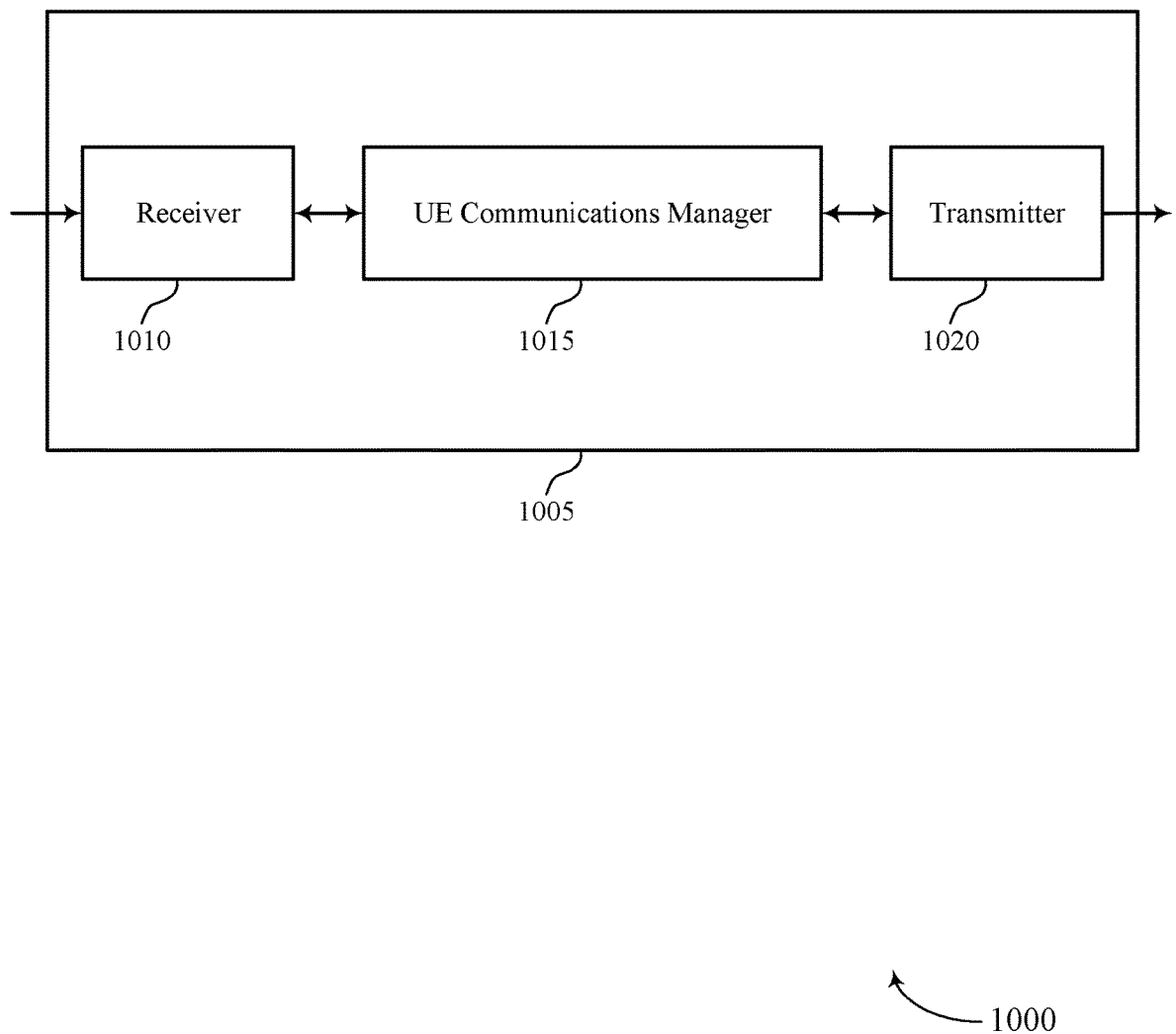
FIGS. 10 and 11 show block diagrams of devices that support data transmission reliability with multiple DCI signals in accordance with aspects of the present disclosure.

FIG. 10 shows a block diagram 1000 of a device 1005 that supports data transmission reliability with multiple DCI signals in accordance with aspects of the present disclosure. The device 1005 may be an example of aspects of a UE 115 as described herein. The device 1005 may include a receiver 1010, a UE communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to data transmission reliability with multiple DCI signals, etc.). Information may be passed on to other components of the device 1005. The receiver 1010 may be an example of aspects of the transceiver 1320 described with reference to FIG. 13. The receiver 1010 may utilize a single antenna or a set of antennas.

The UE communications manager 1015 may identify a capability of the UE to receive a set of DCIs for a set of data channels for a first TB, the set of DCIs each associated with an ACK information transmission occasion occurring after reception of the set of data channels. Additionally, the UE communications manager 1310 may monitor for the set of DCIs according to the identified capability. In some cases, the UE communications manager 1015 may receive, from a base station based on the monitoring, a first DCI and a second DCI scheduling the first TB, the first DCI received in a first CORESET of a first group of CORESETs and the second DCI received in a second CORESET of a second group of CORESETs. Accordingly, the UE communications manager 1015 may attempt to decode the first TB on data channel resources of the set of data channels indicated by the received first DCI and the received second DCI. Subsequently, the UE communications manager 1015 may transmit, to the base station during the ACK information transmission occasion, ACK information associated with the first TB based on the attempted decoding. The UE communications manager 1015 may be an example of aspects of the UE communications manager 1310 described herein.

Based on the actions performed by the UE communications manager 1015 as described herein, a UE 115 may increase reliability that a TB is successfully received and decoded. Accordingly, the UE 115 may save battery power based on not having to request a retransmission of the TB and/or processing any retransmissions of the TB.

The UE communications manager 1015, or its sub-components, may be implemented in hardware, code (e.g., software or firmware) executed by a processor, or any combination thereof. If implemented in code executed by a processor, the functions of the UE communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 1015, or its sub-components, may be physically located at various positions, including being distributed such that portions of functions are implemented at different physical locations by one or more physical components. In some examples, the UE communications manager 1015, or its sub-components, may be a separate and distinct component in accordance with various aspects of the present disclosure. In some examples, the UE communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
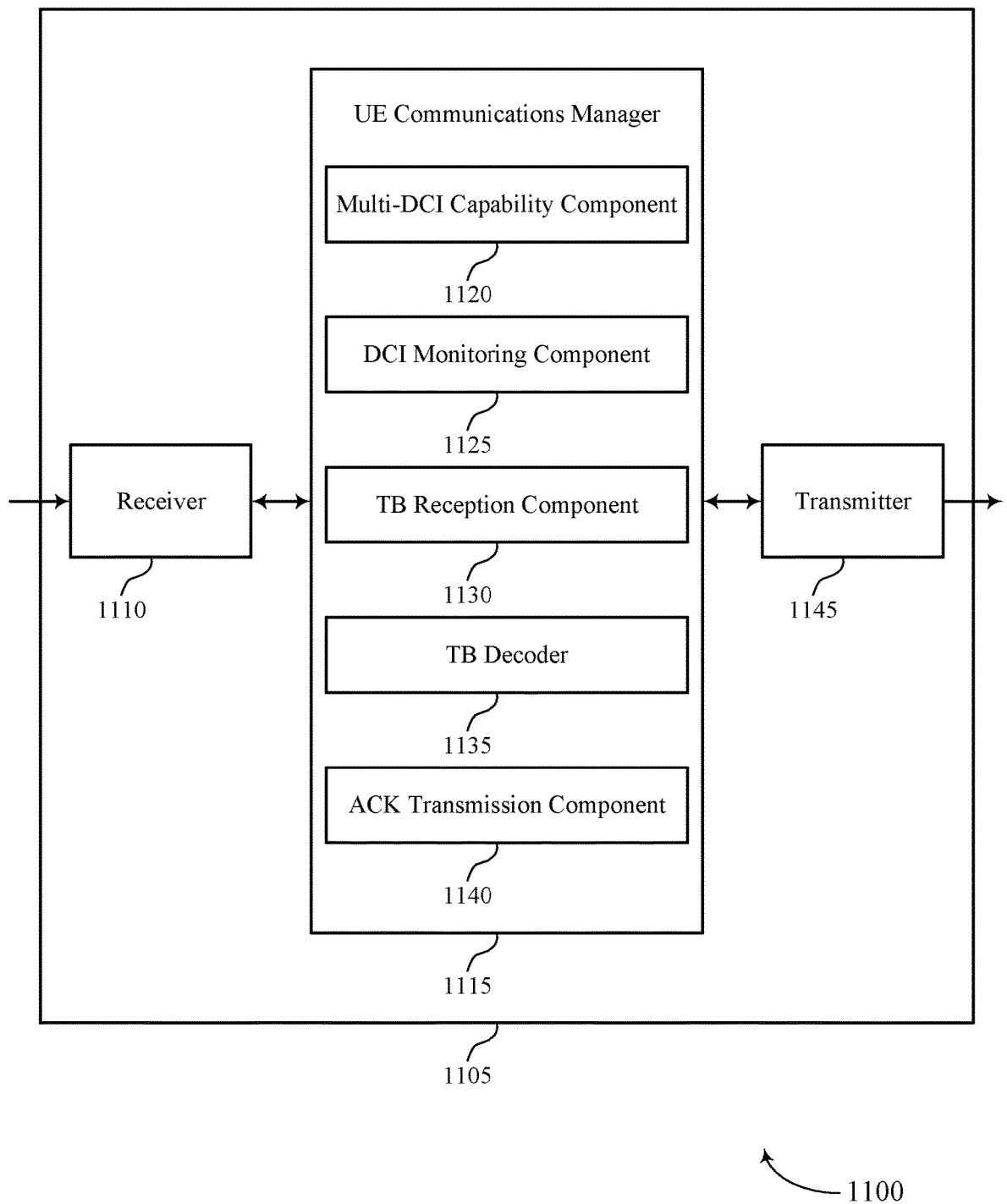

FIG. 11 shows a block diagram 1100 of a device 1105 that supports data transmission reliability with multiple DCIs in accordance with aspects of the present disclosure. The device 1105 may be an example of aspects of a device 1005, or a UE 115 as described herein. The device 1105 may include a receiver 1110, a UE communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to data transmission reliability with multiple DCIs, etc.). Information may be passed on to other components of the device 1105. The receiver 1110 may be an example of aspects of the transceiver 1320 described with reference to FIG. 13. The receiver 1110 may utilize a single antenna or a set of antennas.

The UE communications manager 1115 may be an example of aspects of the UE communications manager 1015 as described herein. The UE communications manager 1115 may include a multi-DCI capability component 1120, a DCI monitoring component 1125, a TB reception component 1130, a TB decoder 1135, and an ACK transmission component 1140. The UE communications manager 1115 may be an example of aspects of the UE communications manager 1310 described herein.

The multi-DCI capability component 1120 may identify a capability of the UE to receive a set of DCIs for a set of data channels for a first TB, the set of DCIs each associated with an ACK information transmission occasion occurring after reception of the set of data channels.

The DCI monitoring component 1125 may monitor for the set of DCIs according to the identified capability.

The TB reception component 1130 may receive, from a base station based on the monitoring, a first DCI and a second DCI scheduling the first TB, the first DCI received in a first CORESET of a first group of CORESETs and the second DCI received in a second CORESET of a second group of CORESETs.

The TB decoder 1135 may attempt to decode the first TB on data channel resources of the set of data channels indicated by the received first DCI and the received second DCI.

The ACK transmission component 1140 may transmit, to the base station during the ACK information transmission occasion, ACK information associated with the first TB based on the attempted decoding.

Based on receiving the one or more DCIs associated with the same TB (e.g., first TB), a processor of a UE 115 (e.g., controlling the receiver 1110, the transmitter 1145, or a transceiver 1320 as described with reference to FIG. 13) may decrease processing power at the UE 115 by using multiple DCIs at once for decoding the TB rather than requesting retransmissions of the TB, thereby reducing the need to process the retransmissions of the TB. Accordingly, the processor of the UE 115 may save power by performing the decoding a lesser number of times than receiving retransmissions and decoding the retransmissions in addition to the original TB transmission.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
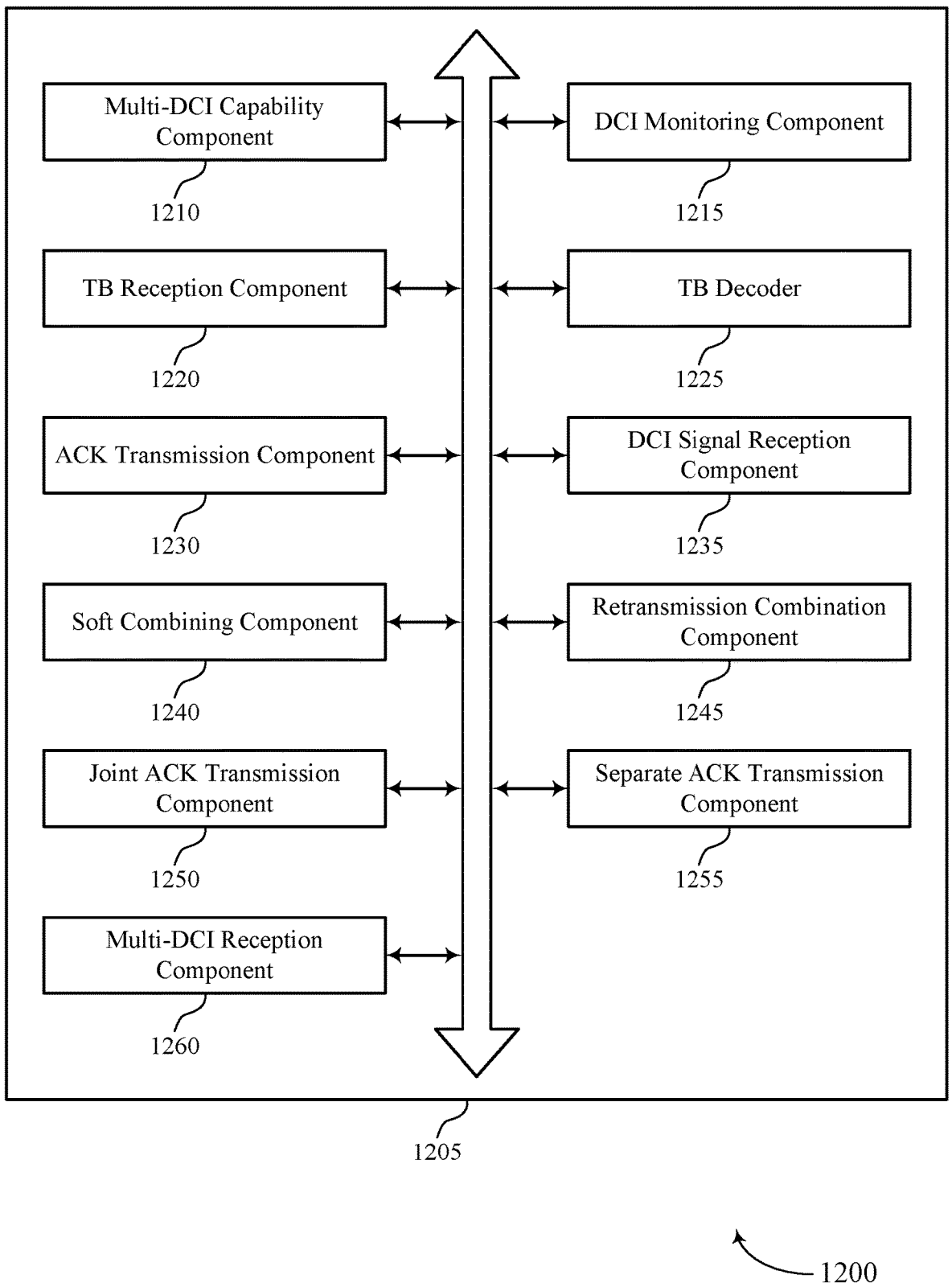
FIG. 12 shows a block diagram of a user equipment (UE) communications manager that supports data transmission reliability with multiple DCI signals in accordance with aspects of the present disclosure.

FIG. 12 shows a block diagram 1200 of a UE communications manager 1205 that supports data transmission reliability with multiple DCI signals in accordance with aspects of the present disclosure. The UE communications manager 1205 may be an example of aspects of a UE communications manager 1015, a UE communications manager 1115, or a UE communications manager 1310 described herein. The UE communications manager 1205 may include a multi-DCI capability component 1210, a DCI monitoring component 1215, a TB reception component 1220, a TB decoder 1225, an ACK transmission component 1230, a DCI signal reception component 1235, a soft combining component 1240, a retransmission combination component 1245, a joint ACK transmission component 1250, a separate ACK transmission component 1255, and a multi-DCI reception component 1260. Each of these modules may communicate, directly or indirectly, with one another (e.g., via one or more buses).

The multi-DCI capability component 1210 may identify a capability of the UE to receive a set of DCIs for a set of data channels for a first TB, the set of DCIs each associated with an ACK information transmission occasion occurring after reception of the set of data channels. In some examples, the multi-DCI capability component 1210 may transmit the identified capability to the base station in a UE capability report. Additionally, the multi-DCI capability component 1210 may transmit an indication of a capability of the UE to process one or more of the set of data channels. In some cases, the UE capability report may further indicate whether the UE is capable of performing soft combining of the set of data channels.

The DCI monitoring component 1215 may monitor for the set of DCIs according to the identified capability. In some cases, the set of DCIs may indicate a same HARQ process for the first TB, or a same NDI, or a combination thereof.

The TB reception component 1220 may receive, from a base station based on the monitoring, a first DCI and a second DCI scheduling the first TB, the first DCI received in a first CORESET of a first group of CORESETs and the second DCI received in a second CORESET of a second group of CORESETs. In some examples, the TB reception component 1220 may determine that a first CRC value of the first DCI is scrambled with a same RNTI as a second CRC value of the second DCI. In some examples, the TB reception component 1220 may determine that a first set of scheduling information in the first DCI matches a second set of scheduling information in the second DCI and may attempt to decode a first data signal associated with the first DCI and a second data signal associated with the second DCI based on the determining. Additionally, the TB reception component 1220 may calculate a TBS based on a first set of scheduling information being the same as a second TBS calculated based on a second set of scheduling information. In some examples, the TB reception component 1220 may receive a set of DCIs from a set of different TRPs, or a set of different antenna arrays associated with a same TRP, or a set of different transmit beams associated with a same TRP, or a set of different TCI states associated with a same TRP, or a combination thereof.

The TB decoder 1225 may attempt to decode the first TB on data channel resources of the set of data channels indicated by the received first DCI and the received second DCI. In some cases, the data channel resources may be SDMed, FDMed, or TDMed, or partially overlapping, or a combination thereof.

The ACK transmission component 1230 may transmit, to the base station during the ACK information transmission occasion, ACK information associated with the first TB based on the attempted decoding. In some cases, a payload size of the ACK information may be based on the identified capability of the UE to receive the set of DCIs for the set of data channels for the first TB. Additionally, a type of the ACK feedback may be configured as dynamic, and the payload size of the ACK information associated with each DAI may be a same size. Alternatively, a type of the ACK feedback may be configured as semi-static, and the payload size of the ACK information associated with each candidate data channel occasion may be a same size.

The DCI signal reception component 1235 may receive the first DCI and the second DCI of the one or more DCIs scheduling the first TB, where a first total DAI (e.g., t-DAI) for the first DCI counts both the first DCI and the second DCI, and where the first and second DCIs are not monitored in a same downlink channel (e.g., PDCCH) monitoring occasion. In some examples, the DCI signal reception component 1235 may receive, from the base station, an indication in the first DCI that the base station will transmit the second DCI. Additionally, the DCI signal reception component 1235 may receive a DCI associated with a second TB, where a first payload size of the ACK information associated with the first TB is different than a second payload size of the ACK information associated with the first TB, and the ACK information associated with the second TB is transmitted with the ACK information associated with the first TB. In some examples, the DCI signal reception component 1235 may separately count a first set of one or more DAIs and a second set of one or more DAIs, where the first set of one or more DAIs are associated with DCIs for TB for which a single DCI is transmitted, and the second set of one or more DAIs are associated with DCIs for TB for which multiple DCIs are transmitted.

The soft combining component 1240 may receive a first data signal associated with the first TB and the first DCI, where the first data signal is a retransmission of a previously received data signal associated with the first TB, and may receive a second data signal associated with the first TB and the second DCI, where the second data signal is a retransmission of the previously received data signal associated with the first TB. Accordingly, the soft combining component 1240 may perform a first soft combining procedure of the received first data signal and the previously received data signal and may perform a second soft combining procedure of the received second data signal and the previously received data signal. Additionally or alternatively, the soft combining component 1240 may determine that the previously received data signal was associated with a DCI received in one of the first control resource set or the second control resource set and may perform, based on the determining, a soft combining procedure of the received first data signal and the previously received data signal, or the received second data signal and the previously received data signal.

In some examples, the soft combining component 1240 may receive the first data signal associated with the first TB and the first DCI, where the first data signal is a retransmission of a previously received data signal associated with the first TB; may receive a second data signal associated with the first TB and the second DCI, where the second data signal is a retransmission of the previously received data signal associated with the first TB; and may perform a soft combining procedure of the received first data signal and the previously received data signal, or the received second data signal and the previously received data signal, based on a selection rule.

The retransmission combination component 1245 may receive a first data signal associated with the first TB and the first DCI, may receive a second data signal associated with the first TB and the second DCI, may receive, after transmitting the ACK information, a third DCI scheduling the first TB, and may receive a third data signal associated with the third DCI, where the third data signal is a retransmission of the first TB. In some examples, the retransmission combination component 1245 may perform a first soft combining procedure of the third data signal and the first data signal and may perform a second soft combining procedure of the third data signal and the second data signal. Additionally or alternatively, the retransmission combination component 1245 may determine that both the first DCI and the third DCI were received in the first control resource set or the first group of CORESETs that includes at least the first CORESET and may perform, based on the determining, a soft combining procedure of the third data signal and the first data signal. In some examples, the retransmission combination component 1245 may receive a third data signal associated with the third DCI, where the third data signal is a retransmission of the first TB, and may perform a soft combining procedure of the third data signal and the first data signal, or the third data signal and the second data signal, based on a selection rule.

In some cases, the received first DCI and the received second DCI may indicate a same set of resources for transmission of the ACK information (e.g., joint feedback/PUCCH). Accordingly, the joint ACK transmission component 1250 may transmit a first ACK bit, a second ACK bit, and a combined ACK bit in the same set of resources for transmission of the ACK information, where the first ACK bit corresponds to a first data signal for the TB associated with a first of the set of DCIs, the second ACK bit corresponds to a second data signal for the TB associated with a second of the set of DCIs, and the combined ACK bit corresponds to a result of soft combining the first data signal and the second data signal.

Alternatively, the received first DCI and the received second DCI may indicate different sets of resources for transmission of the ACK information (e.g., separate feedback/PUCCHs). Accordingly, the separate ACK transmission component 1255 may transmit a first ACK bit and a combined ACK bit in a first set of the different sets of resources for transmission of the ACK information and may transmit a second ACK bit and the combined ACK bit in a second set of the different sets of resources for transmission of the ACK information. In some examples, the first ACK bit may correspond to a first data signal for the TB associated with a first of the set of DCIs, the second ACK bit may correspond to a second data signal for the TB associated with a second of the set of DCIs, and the combined ACK bit may correspond to a result of soft combining the first data signal and the second data signal.

In some cases, the ACK information associated with the first TB may include the first ACK bit and the second ACK bit for the first TB, where the first ACK bit is for a first data signal associated with a first of the set of DCIs and the second ACK bit is for a second data signal associated with a second of the set of DCIs. Additionally or alternatively, the ACK information associated with the first TB may include the first ACK bit and the combined ACK bit for the first TB, where the first ACK bit is for a first data signal associated with a first of the set of DCIs and the combined ACK bit is for a combination of the first data signal and a second data signal associated with a second of the set of DCIs. In some cases, the ACK information associated with the first TB may include a first combined ACK bit and a second combined ACK bit for the first TB, where the first combined ACK bit is for a combination of a first data signal associated with a first of the set of DCIs and a second data signal associated with a second of the set of DCIs and the second combined ACK bit is for the combination of the first data signal and the second data signal.

The multi-DCI reception component 1260 may receive, from a first TRP, the first DCI for the first TB in the first CORESET and may receive, from a second TRP, the second DCI for the first TB in the second CORESET. In some examples, the multi-DCI reception component 1260 may receive, from the first TRP, the first TB on data channel resources of a first data channel of the set of data channels and may receive, from the second TRP, the first TB on data channel resources of a second data channel of the set of data channels. In some cases, the first CORESET may be part of a first CORESET group, and the second CORESET is part of the first CORESET group or a second CORESET group.

Figure 13:
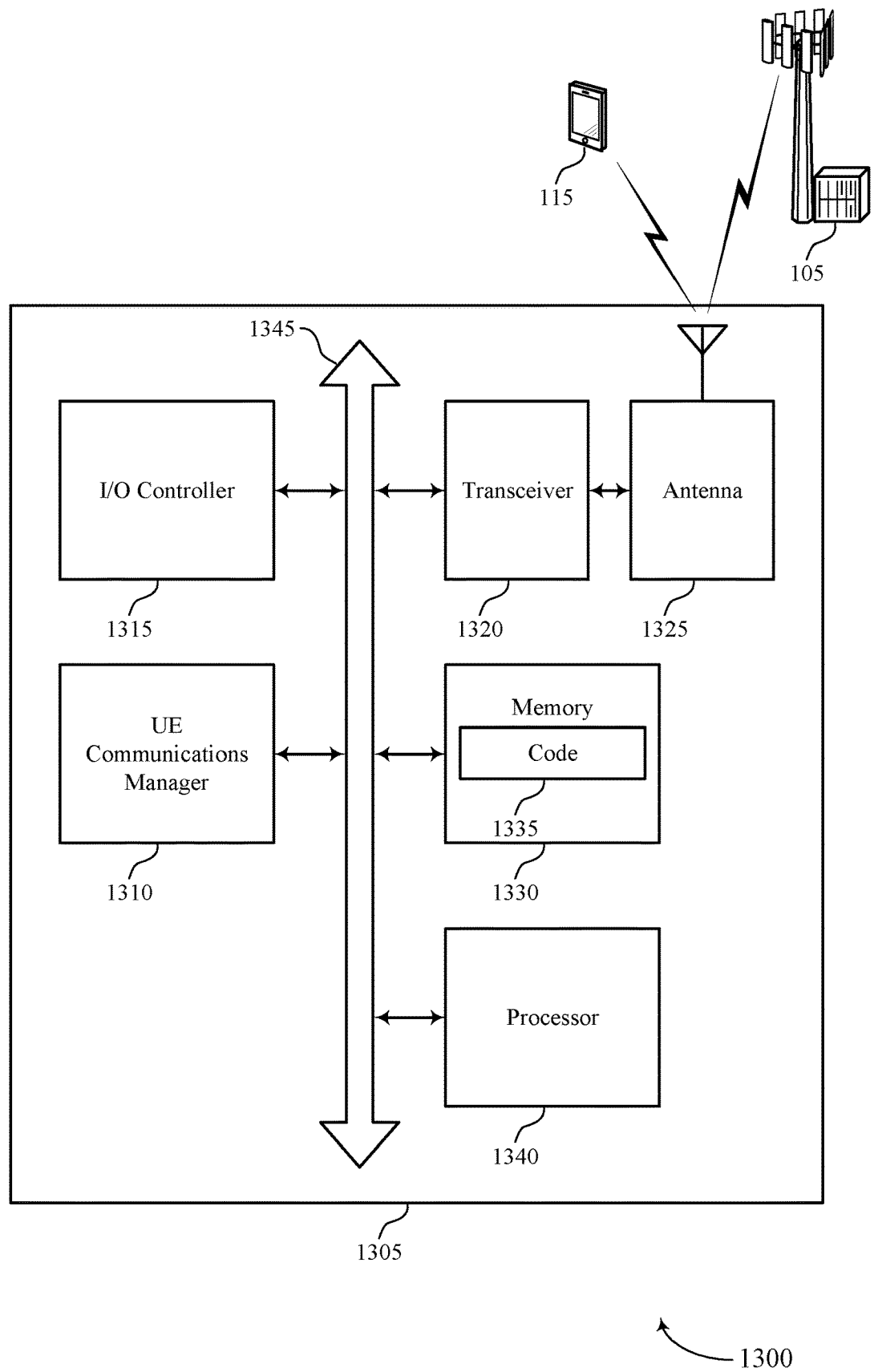
FIG. 13 shows a diagram of a system including a device that supports data transmission reliability with multiple DCI signals in accordance with aspects of the present disclosure.

FIG. 13 shows a diagram of a system 1300 including a device 1305 that supports data transmission reliability with multiple DCIs in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a UE communications manager 1310, an I/O controller 1315, a transceiver 1320, an antenna 1325, memory 1330, and a processor 1340. These components may be in electronic communication via one or more buses (e.g., bus 1345).

The UE communications manager 1310 may identify a capability of the UE to receive a set of DCIs for a set of data channels for a first TB, the set of DCIs each associated with an ACK information transmission occasion occurring after reception of the set of data channels. Additionally, the UE communications manager 1310 may monitor for the set of DCIs according to the identified capability. In some cases, the UE communications manager 1310 may receive, from a base station based on the monitoring, a first DCI and a second DCI scheduling the first TB, the first DCI received in a first CORESET of a first group of CORESETs and the second DCI received in a second CORESET of a second group of CORESETs. Accordingly, the UE communications manager 1310 may attempt to decode the first TB on data channel resources of the set of data channels indicated by the received first DCI and the received second DCI. Subsequently, the UE communications manager 1310 may transmit, to the base station during the ACK information transmission occasion, ACK information associated with the first TB based on the attempted decoding.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting data transmission reliability with multiple DCI signals).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
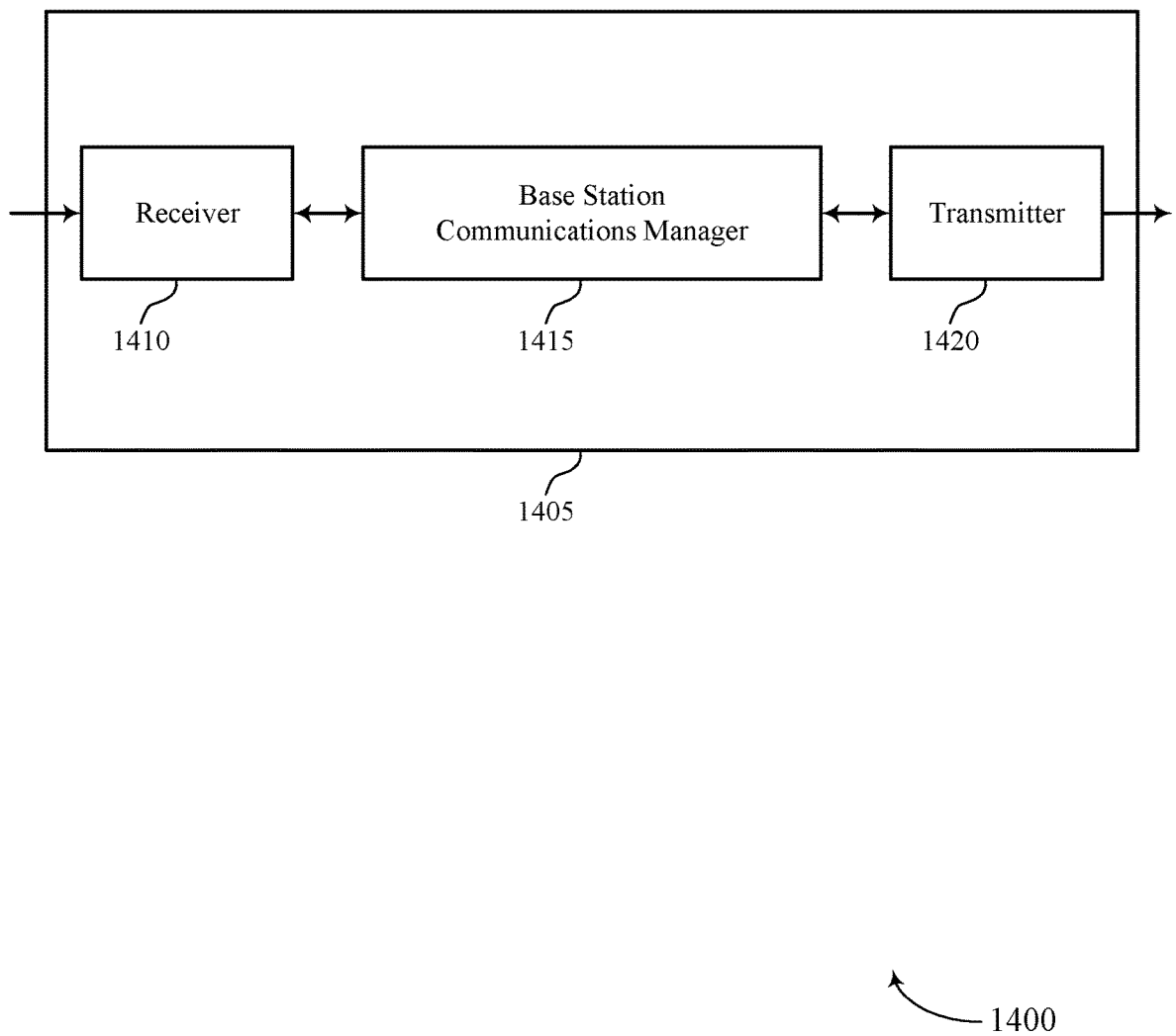
FIGS. 14 and 15 show block diagrams of devices that support data transmission reliability with multiple DCI signals in accordance with aspects of the present disclosure.

FIG. 14 shows a block diagram 1400 of a device 1405 that supports data transmission reliability with multiple DCI signals in accordance with aspects of the present disclosure. The device 1405 may be an example of aspects of a base station 105 as described herein. The device 1405 may include a receiver 1410, a base station communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to data transmission reliability with multiple DCI signals, etc.). Information may be passed on to other components of the device 1405. The receiver 1410 may be an example of aspects of the transceiver 1720 described with reference to FIG. 17. The receiver 1410 may utilize a single antenna or a set of antennas.

The base station communications manager 1415 may receive, from a UE, an indication of a capability of the UE to receive a set of DCIs for a set of data channels for a first TB. In some cases, the base station communications manager 1415 may transmit, to the UE, a first DCI of the set of DCIs scheduling the first TB, the first DCI transmitted in a first CORESET of a first group of CORESETs, and may transmit, to the UE, a second DCI of the set of DCIs scheduling the first TB, the second DCI transmitted in a second CORESET of a second group of CORESETs. Additionally, the base station communications manager 1415 may transmit, according to the first DCI, a first data signal on a first data channel of the set of data channels and may transmit, according to the second DCI, a second data signal on a second data channel of the set of data channels. Accordingly, the base station communications manager 1415 may receive, from the UE based on the received indication of the capability, ACK information associated with the first TB. The base station communications manager 1415 may be an example of aspects of the base station communications manager 1710 described herein.

The base station communications manager 1415, or its sub-components, may be implemented in hardware, code (e.g., software or firmware) executed by a processor, or any combination thereof. If implemented in code executed by a processor, the functions of the base station communications manager 1415, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1415, or its sub-components, may be physically located at various positions, including being distributed such that portions of functions are implemented at different physical locations by one or more physical components. In some examples, the base station communications manager 1415, or its sub-components, may be a separate and distinct component in accordance with various aspects of the present disclosure. In some examples, the base station communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
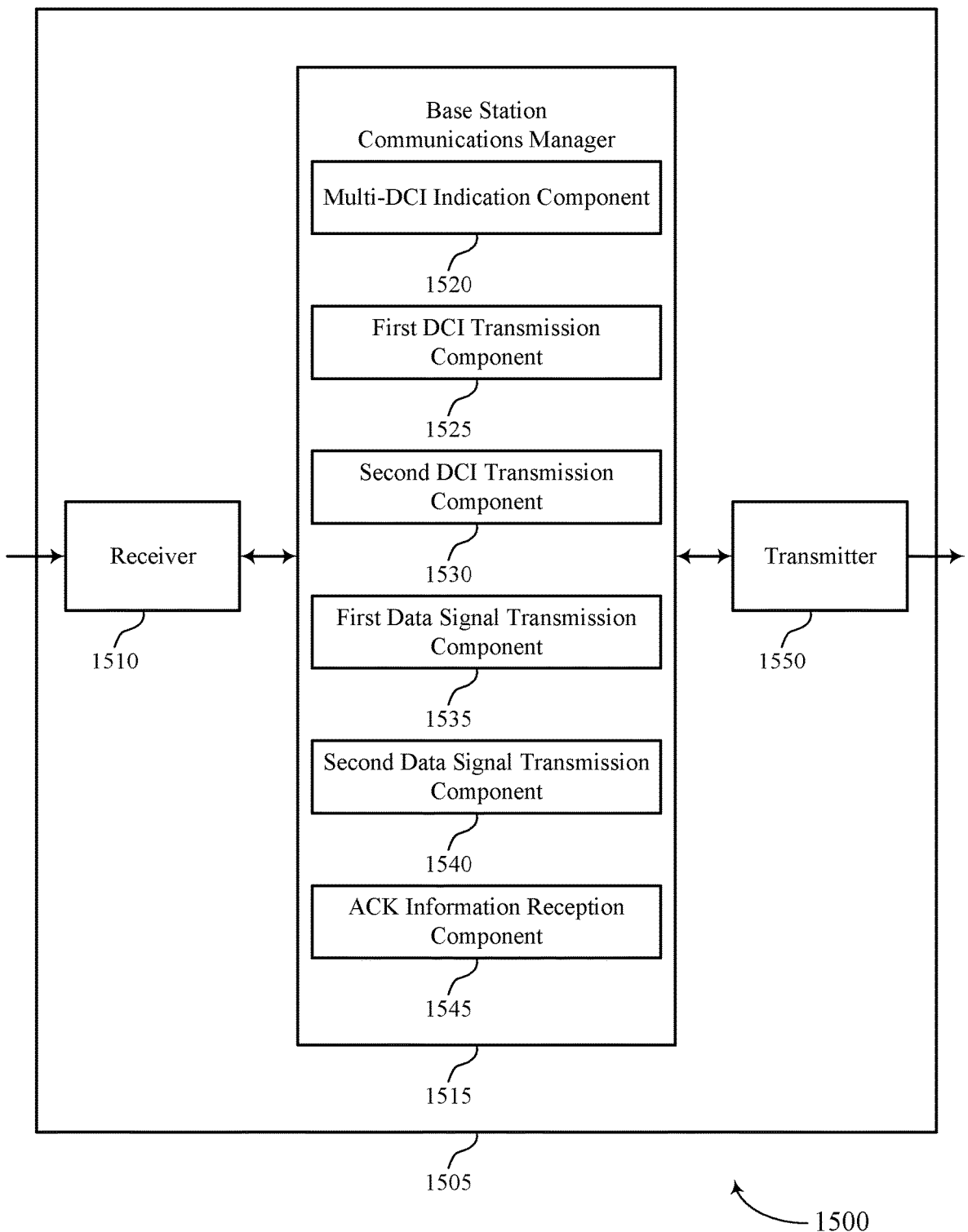

FIG. 15 shows a block diagram 1500 of a device 1505 that supports data transmission reliability with multiple DCI signals in accordance with aspects of the present disclosure. The device 1505 may be an example of aspects of a device 1405, or a base station 105 as described herein. The device 1505 may include a receiver 1510, a base station communications manager 1515, and a transmitter 1550. The device 1505 may also include a processor. Each of these components may be in communication with one another (e.g., via one or more buses).

The receiver 1510 may receive information such as packets, user data, or control information associated with various information channels (e.g., control channels, data channels, and information related to data transmission reliability with multiple DCI signals, etc.). Information may be passed on to other components of the device 1505. The receiver 1510 may be an example of aspects of the transceiver 1720 described with reference to FIG. 17. The receiver 1510 may utilize a single antenna or a set of antennas.

The base station communications manager 1515 may be an example of aspects of the base station communications manager 1415 as described herein. The base station communications manager 1515 may include a multi-DCI indication component 1520, a first DCI transmission component 1525, a second DCI transmission component 1530, a first data signal transmission component 1535, a second data signal transmission component 1540, and an ACK information reception component 1545. The base station communications manager 1515 may be an example of aspects of the base station communications manager 1710 described herein.

The multi-DCI indication component 1520 may receive, from a UE, an indication of a capability of the UE to receive a set of DCIs for a set of data channels for a first TB.

The first DCI transmission component 1525 may transmit, to the UE, a first DCI of the set of DCIs scheduling the first TB, the first DCI transmitted in a first CORESET of a first group of CORESETs.

The second DCI transmission component 1530 may transmit, to the UE, a second DCI of the set of DCIs scheduling the first TB, the second DCI transmitted in a second CORESET of a second group of CORESETs.

The first data signal transmission component 1535 may transmit, according to the first DCI, a first data signal on a first data channel of the set of data channels.

The second data signal transmission component 1540 may transmit, according to the second DCI, a second data signal on a second data channel of the set of data channels.

The ACK information reception component 1545 may receive, from the UE based on the received indication of the capability, ACK information associated with the first TB.

The transmitter 1550 may transmit signals generated by other components of the device 1505. In some examples, the transmitter 1550 may be collocated with a receiver 1510 in a transceiver module. For example, the transmitter 1550 may be an example of aspects of the transceiver 1720 described with reference to FIG. 17. The transmitter 1550 may utilize a single antenna or a set of antennas.

Figure 16:
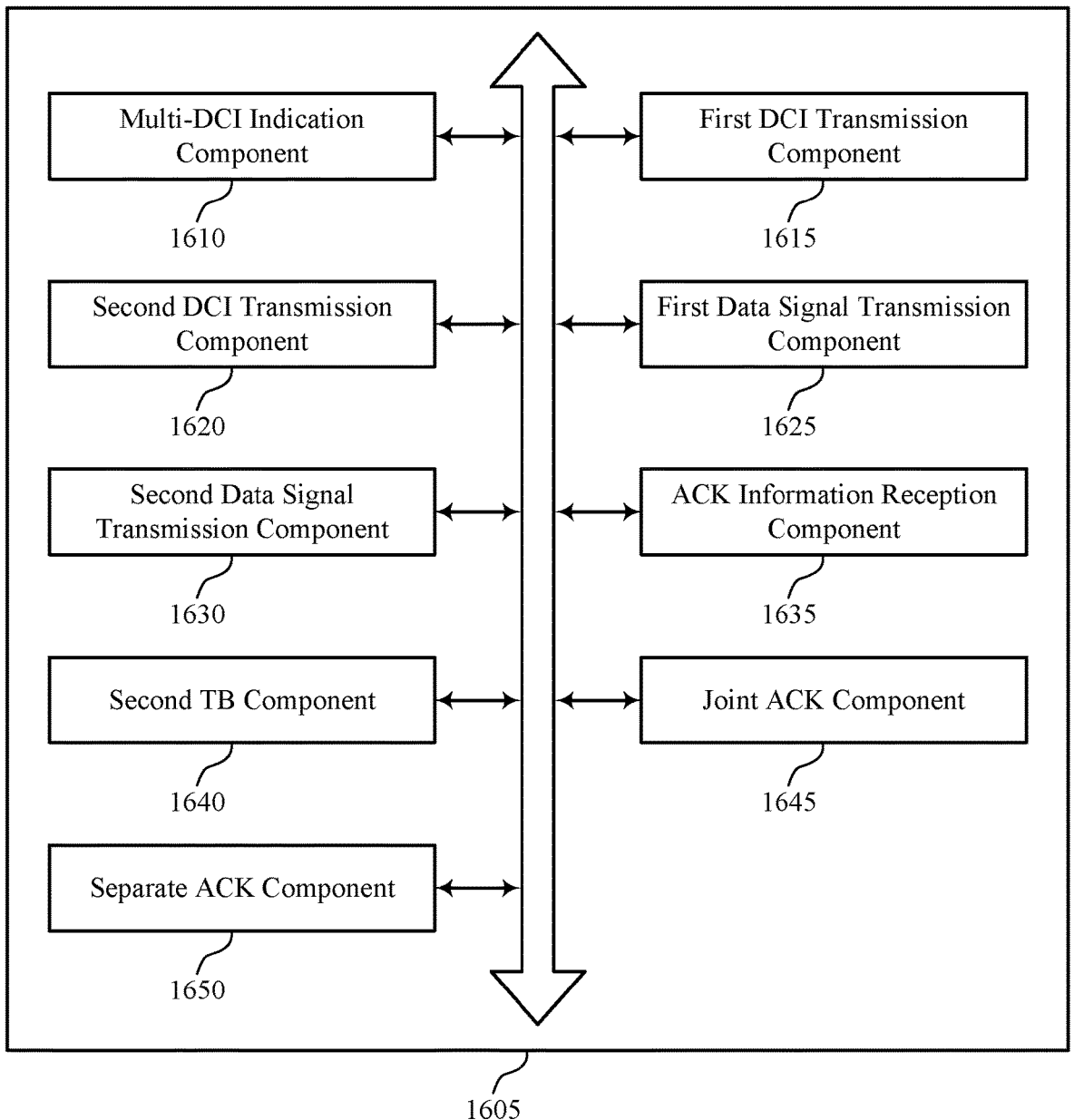
FIG. 16 shows a block diagram of a base station communications manager that supports data transmission reliability with multiple DCI signals in accordance with aspects of the present disclosure.

FIG. 16 shows a block diagram 1600 of a base station communications manager 1605 that supports data transmission reliability with multiple DCI signals in accordance with aspects of the present disclosure. The base station communications manager 1605 may be an example of aspects of a base station communications manager 1415, a base station communications manager 1515, or a base station communications manager 1710 described herein. The base station communications manager 1605 may include a multi-DCI indication component 1610, a first DCI transmission component 1615, a second DCI transmission component 1620, a first data signal transmission component 1625, a second data signal transmission component 1630, an ACK information reception component 1635, a second TB component 1640, a joint ACK component 1645, and a separate ACK component 1650. Each of these modules may communicate, directly or indirectly, with one another (e.g., via one or more buses).

The multi-DCI indication component 1610 may receive, from a UE, an indication of a capability of the UE to receive a set of DCIs for a set of data channels for a first TB. In some examples, the multi-DCI indication component 1610 may receive a UE capability report that includes the indication. Additionally, the multi-DCI indication component 1610 may receive, from the UE, an indication of a capability of the UE to process one or more of the set of data channels. In some cases, the UE capability report may further indicate whether the UE is capable of performing soft combining of the set of data channels.

The first DCI transmission component 1615 may transmit, to the UE, a first DCI of the set of DCIs scheduling the first TB, the first DCI transmitted in a first CORESET of a first group of CORESETs. The second DCI transmission component 1620 may transmit, to the UE, a second DCI of the set of DCIs scheduling the first TB, the second DCI transmitted in a second CORESET of a second group of CORESETs. In some cases, a first total DAI for the first DCI may count both the first DCI and the second DCI, where the first and second DCIs are not monitored in a same downlink channel (e.g., PDCCH) monitoring occasion. Additionally, the set of DCIs may indicate a same HARQ process for the first TB, or a same NDI, or a combination thereof. In some cases, the first DCI for the first TB may be transmitted via a first TRP in a first CORESET, and the second DCI for the first TB may be transmitted via a second TRP in a second CORESET. Accordingly, the first CORESET may be part of a first CORESET group, and the second CORESET may be part of the first CORESET group or a second CORESET group. In some cases, the first DCI and the second DCI may be transmitted via different TRPs, or different antenna arrays associated with a same TRP, or different transmit beams associated with a same TRP, or different TCI states associated with a same TRP, or a combination thereof.

The first data signal transmission component 1625 may transmit, according to the first DCI, a first data signal on a first data channel of the set of data channels. The second data signal transmission component 1630 may transmit, according to the second DCI, a second data signal on a second data channel of the set of data channels. In some cases, the data channel resources may be SDMed, FDMed, or TDMed, or partially overlapping, or a combination thereof. Additionally, the first data signal may be transmitted on the first data channel via a first TRP, and the second data signal may be transmitted on the second data channel via a second TRP.

The ACK information reception component 1635 may receive, from the UE based on the received indication of the capability, ACK information associated with the first TB. In some cases, a payload size of the ACK information may be based on the indicated capability of the UE to receive the set of DCIs for the set of data channels for the first TB. Additionally, a type of the ACK feedback may be configured as dynamic, and the payload size of the ACK information associated with each downlink assignment index may be a same size. Alternatively, a type of the ACK feedback may be configured as semi-static, and the payload size of the ACK information associated with each candidate data channel occasion may be a same size.

In some cases, the first DCI may include an indication that the base station will transmit the second DCI. Accordingly, the second TB component 1640 may transmit a DCI associated with a second TB, where a first payload size of the ACK information associated with the first TB is different than a second payload size of the ACK information associated with the first TB, and the ACK information associated with the second TB is received with the ACK information associated with the first TB.

In some cases, the first DCI and the second DCI may indicate a same set of resources for transmission of the ACK information. Accordingly, the joint ACK component 1645 may receive a first ACK bit, a second ACK bit, and a combined ACK bit in a first set of uplink resources, where the first ACK bit corresponds to the first data signal, the second ACK bit corresponds to the second data signal, and the combined ACK bit corresponds to a result of the UE soft combining the first data signal and the second data signal.

Alternatively, the first DCI and the second DCI may indicate different sets of resources for transmission of the ACK information. Accordingly, the separate ACK component 1650 may receive a first ACK bit and a combined ACK bit in a first set of the different sets of resources for transmission of the ACK information and may receive a second ACK bit and the combined ACK bit in a second set of the different sets of resources for transmission of the ACK information. In some cases, the first ACK bit may correspond to a first data signal for the TB associated with a first of the set of DCIs, the second ACK bit may correspond to a second data signal for the TB associated with a second of the set of DCIs, and the combined ACK bit may correspond to a result of the UE soft combining the first data signal and the second data signal.

In some cases, the ACK information associated with the first TB may include the first ACK bit and the second ACK bit for the first TB, where the first ACK bit is for the first data signal and the second ACK bit is for the second data signal. Additionally or alternatively, the ACK information associated with the first TB may include the first ACK bit and the combined ACK bit for the first TB, where the first ACK bit is for the first data signal and the combined ACK bit is for a combination of the first data signal and the second data signal. In some cases, the ACK information associated with the first TB may include a first combined ACK bit and a second combined ACK bit for the first TB, where the first combined ACK bit is for a combination of the first data signal and the second data signal and the second combined ACK bit is for the combination of the first data signal and the second data signal.

Figure 17:
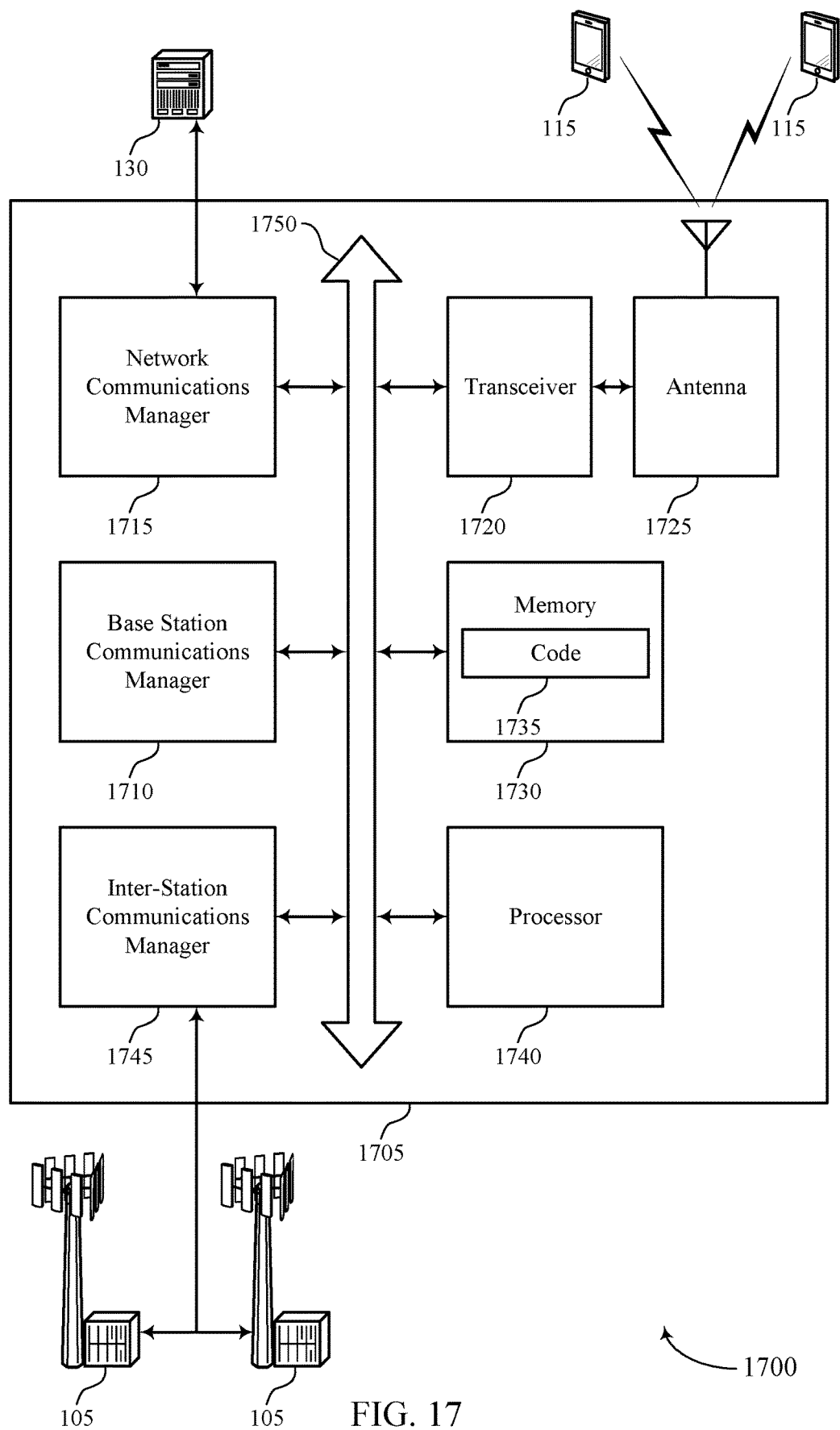
FIG. 17 shows a diagram of a system including a device that supports data transmission reliability with multiple DCI signals in accordance with aspects of the present disclosure.

FIG. 17 shows a diagram of a system 1700 including a device 1705 that supports data transmission reliability with multiple DCI signals in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a base station communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The base station communications manager 1710 may receive, from a UE, an indication of a capability of the UE to receive a set of DCIs for a set of data channels for a first TB. In some cases, the base station communications manager 1710 may transmit, to the UE, a first DCI of the set of DCIs scheduling the first TB, the first DCI transmitted in a first CORESET of a first group of CORESETs, and may transmit, to the UE, a second DCI of the set of DCIs scheduling the first TB, the second DCI transmitted in a second CORESET of a second group of CORESETs. Additionally, the base station communications manager 1710 may transmit, according to the first DCI, a first data signal on a first data channel of the set of data channels and may transmit, according to the second DCI, a second data signal on a second data channel of the set of data channels. Accordingly, the base station communications manager 1710 may receive, from the UE based on the received indication of the capability, ACK information associated with the first TB.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting data transmission reliability with multiple DCI signals).

The inter-station communications manager 1745 may manage communications with other base station 105 and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
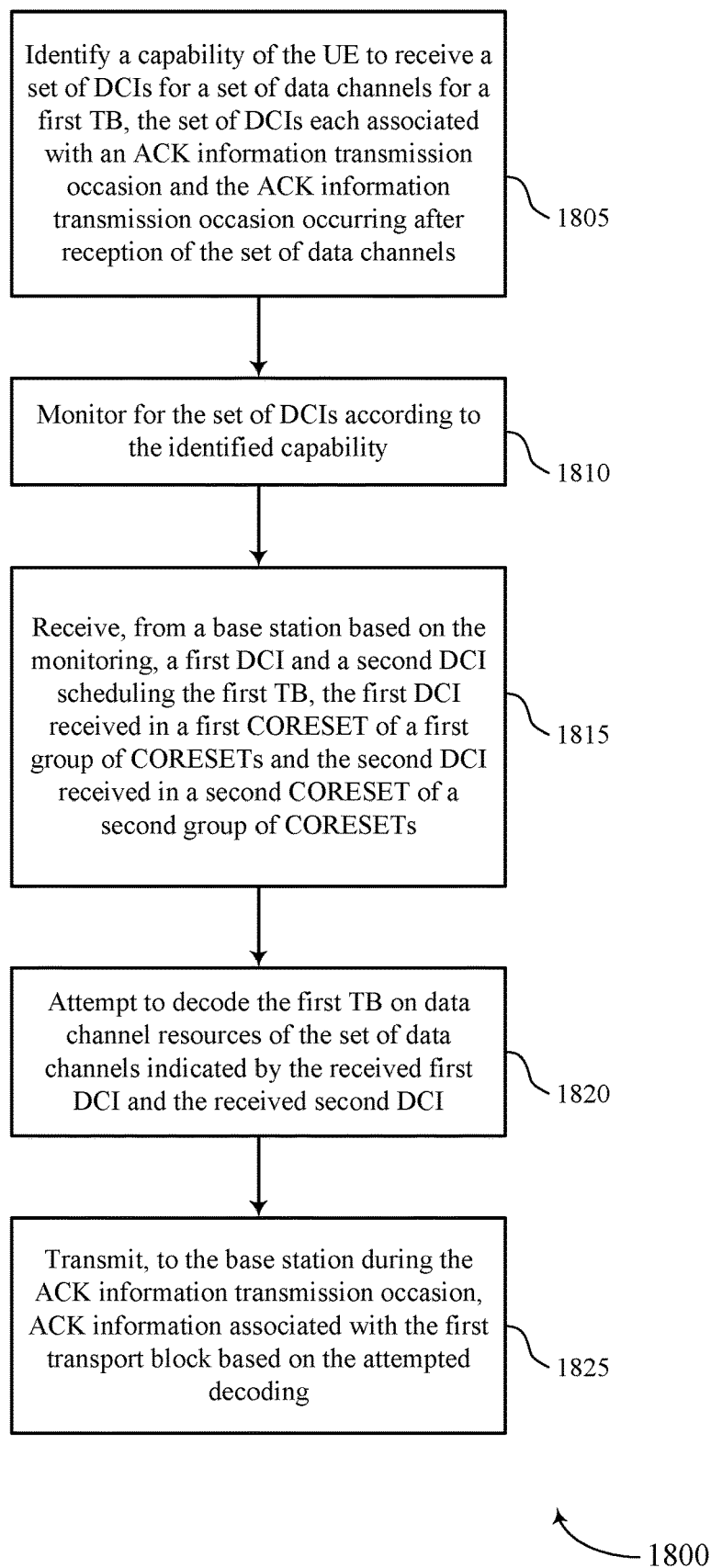
FIGS. 18 through 22 show flowcharts illustrating methods that support data transmission reliability with multiple DCI signals in accordance with aspects of the present disclosure.

FIG. 18 shows a flowchart illustrating a method 1800 that supports data transmission reliability with multiple DCI signals in accordance with aspects of the present disclosure. The operations of method 1800 may be implemented by a UE 115 or its components as described herein. For example, the operations of method 1800 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may identify a capability of the UE to receive a set of DCIs for a set of data channels for a first TB, the set of DCIs each associated with an ACK information transmission occasion occurring after reception of the set of data channels. The operations of 1805 may be performed according to the methods described herein. In some examples, aspects of the operations of 1805 may be performed by a multi-DCI capability component as described with reference to FIGS. 10 through 13.

At 1810, the UE may monitor for the set of DCIs according to the identified capability. The operations of 1810 may be performed according to the methods described herein. In some examples, aspects of the operations of 1810 may be performed by a DCI monitoring component as described with reference to FIGS. 10 through 13.

At 1815, the UE may receive, from a base station based on the monitoring, a first DCI and a second DCI scheduling the first TB, the first DCI received in a first CORESET of a first group of CORESETs and the second DCI received in a second CORESET of a second group of CORESETs. The operations of 1815 may be performed according to the methods described herein. In some examples, aspects of the operations of 1815 may be performed by a TB reception component as described with reference to FIGS. 10 through 13.

At 1820, the UE may attempt to decode the first TB on data channel resources of the set of data channels indicated by the received first DCI and the received second DCI. The operations of 1820 may be performed according to the methods described herein. In some examples, aspects of the operations of 1820 may be performed by a TB decoder as described with reference to FIGS. 10 through 13.

At 1825, the UE may transmit, to the base station during the ACK information transmission occasion, ACK information associated with the first TB based on the attempted decoding. The operations of 1825 may be performed according to the methods described herein. In some examples, aspects of the operations of 1825 may be performed by an ACK transmission component as described with reference to FIGS. 10 through 13.

Figure 19:
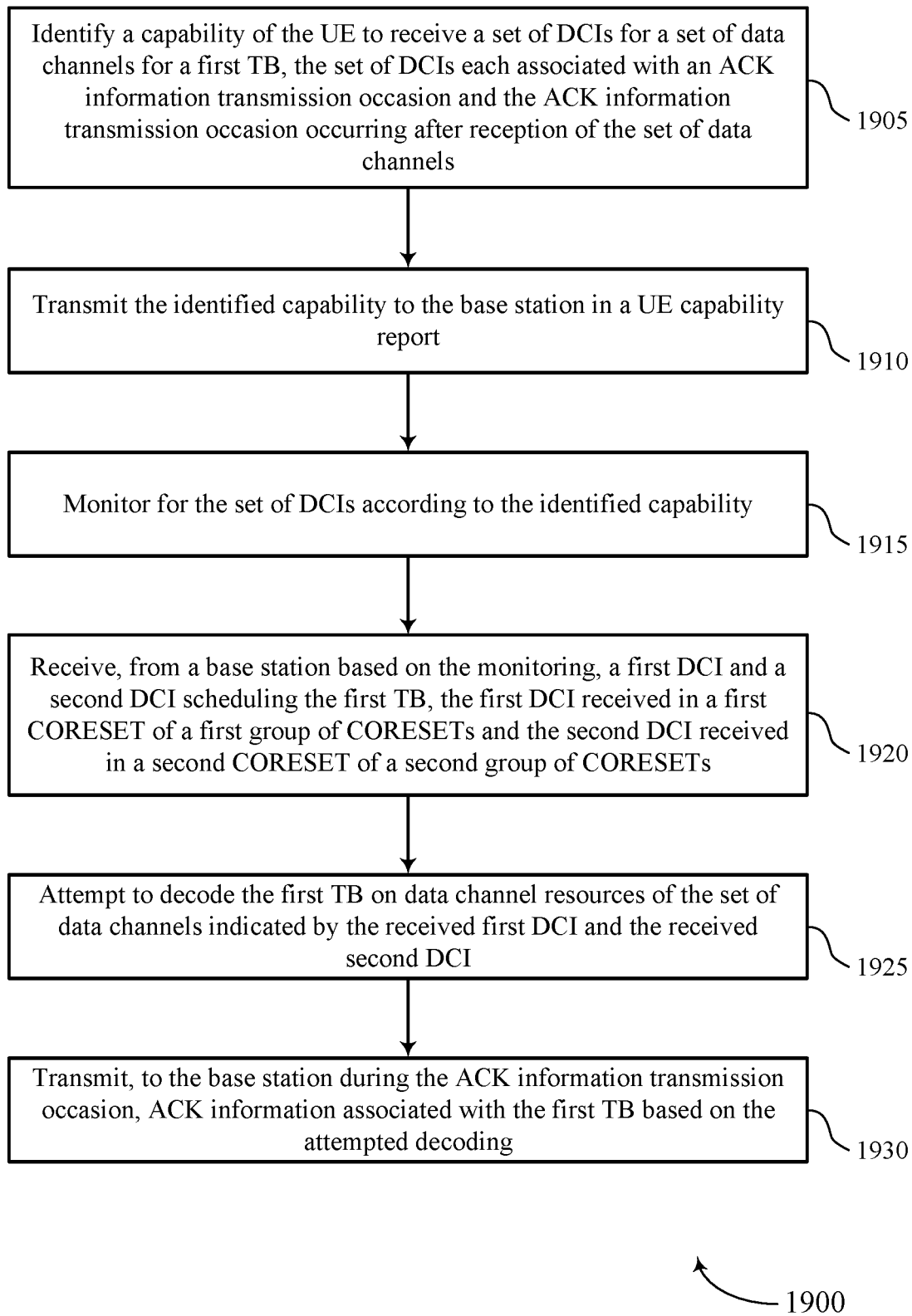

FIG. 19 shows a flowchart illustrating a method 1900 that supports data transmission reliability with multiple DCI signals in accordance with aspects of the present disclosure. The operations of method 1900 may be implemented by a UE 115 or its components as described herein. For example, the operations of method 1900 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may identify a capability of the UE to receive a set of DCIs for a set of data channels for a first TB, the set of DCIs each associated with an ACK information transmission occasion occurring after reception of the set of data channels. The operations of 1905 may be performed according to the methods described herein. In some examples, aspects of the operations of 1905 may be performed by a multi-DCI capability component as described with reference to FIGS. 10 through 13.

At 1910, the UE may transmit the identified capability to the base station in a UE capability report. The operations of 1910 may be performed according to the methods described herein. In some examples, aspects of the operations of 1910 may be performed by a multi-DCI capability component as described with reference to FIGS. 10 through 13.

At 1915, the UE may monitor for the set of DCIs according to the identified capability. The operations of 1915 may be performed according to the methods described herein. In some examples, aspects of the operations of 1915 may be performed by a DCI monitoring component as described with reference to FIGS. 10 through 13.

At 1920, the UE may receive, from a base station based on the monitoring, a first DCI and a second DCI scheduling the first TB, the first DCI received in a first CORESET of a first group of CORESETs and the second DCI received in a second CORESET of a second group of CORESETs. The operations of 1920 may be performed according to the methods described herein. In some examples, aspects of the operations of 1920 may be performed by a TB reception component as described with reference to FIGS. 10 through 13.

At 1925, the UE may attempt to decode the first TB on data channel resources of the set of data channels indicated by the received first DCI and the received second DCI. The operations of 1925 may be performed according to the methods described herein. In some examples, aspects of the operations of 1925 may be performed by a TB decoder as described with reference to FIGS. 10 through 13.

At 1930, the UE may transmit, to the base station during the ACK information transmission occasion, ACK information associated with the first TB based on the attempted decoding. The operations of 1930 may be performed according to the methods described herein. In some examples, aspects of the operations of 1930 may be performed by an ACK transmission component as described with reference to FIGS. 10 through 13.

Figure 20:
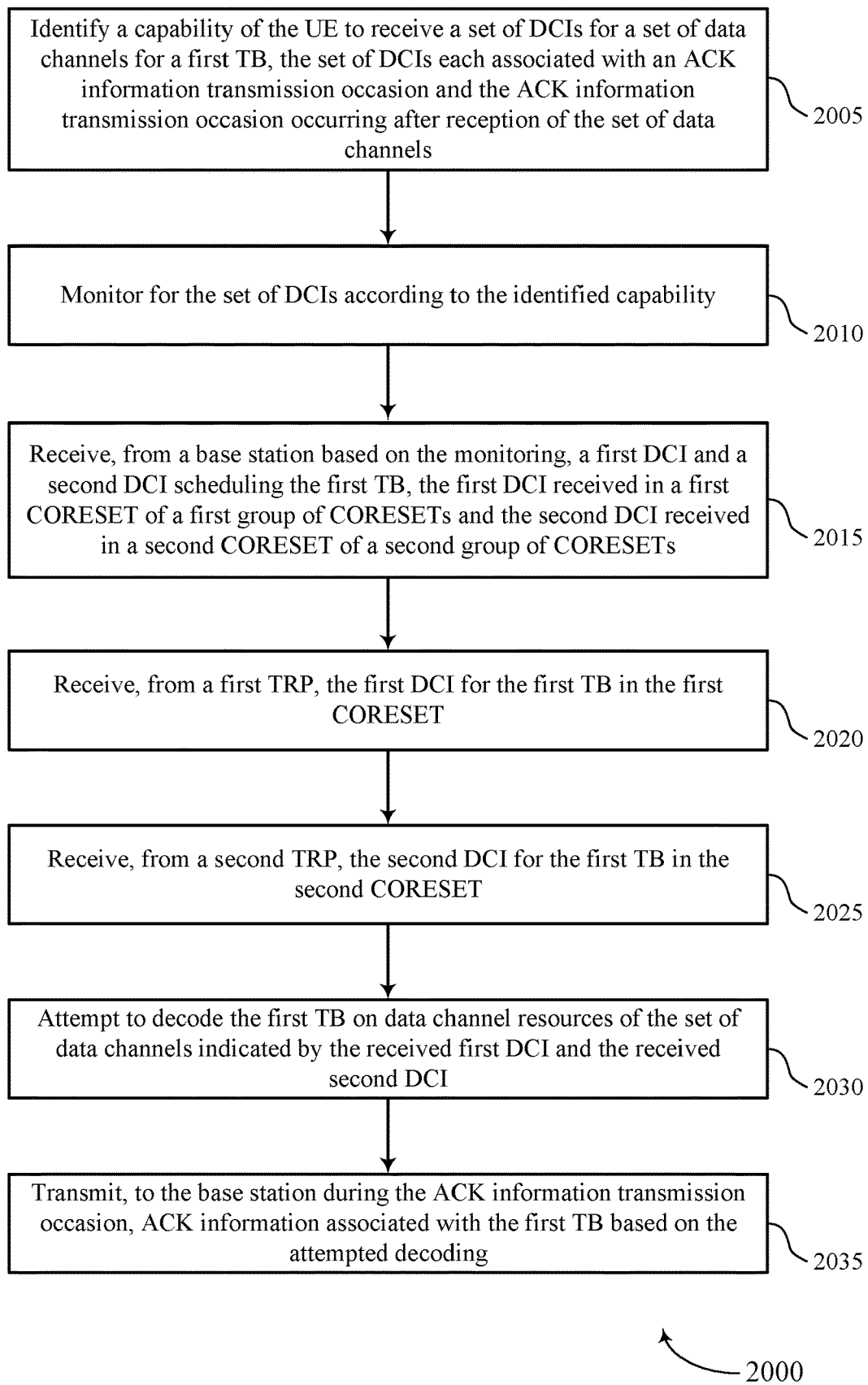

FIG. 20 shows a flowchart illustrating a method 2000 that supports data transmission reliability with multiple DCI signals in accordance with aspects of the present disclosure. The operations of method 2000 may be implemented by a UE 115 or its components as described herein. For example, the operations of method 2000 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2005, the UE may identify a capability of the UE to receive a set of DCIs for a set of data channels for a first TB, the set of DCIs each associated with an ACK information transmission occasion occurring after reception of the set of data channels. The operations of 2005 may be performed according to the methods described herein. In some examples, aspects of the operations of 2005 may be performed by a multi-DCI capability component as described with reference to FIGS. 10 through 13.

At 2010, the UE may monitor for the set of DCIs according to the identified capability. The operations of 2010 may be performed according to the methods described herein. In some examples, aspects of the operations of 2010 may be performed by a DCI monitoring component as described with reference to FIGS. 10 through 13.

At 2015, the UE may receive, from a base station based on the monitoring, a first DCI and a second DCI scheduling the first TB, the first DCI received in a first CORESET of a first group of CORESETs and the second DCI received in a second CORESET of a second group of CORESETs. The operations of 2015 may be performed according to the methods described herein. In some examples, aspects of the operations of 2015 may be performed by a TB reception component as described with reference to FIGS. 10 through 13.

At 2020, the UE may receive, from a first TRP, the first DCI for the first TB in the first CORESET. The operations of 2020 may be performed according to the methods described herein. In some examples, aspects of the operations of 2020 may be performed by a multi-DCI reception component as described with reference to FIGS. 10 through 13.

At 2025, the UE may receive, from a second TRP, the second DCI for the first TB in the second CORESET. The operations of 2025 may be performed according to the methods described herein. In some examples, aspects of the operations of 2025 may be performed by a multi-DCI reception component as described with reference to FIGS. 10 through 13.

At 2030, the UE may attempt to decode the first TB on data channel resources of the set of data channels indicated by the received first DCI and the received second DCI. The operations of 2030 may be performed according to the methods described herein. In some examples, aspects of the operations of 2030 may be performed by a TB decoder as described with reference to FIGS. 10 through 13.

At 2035, the UE may transmit, to the base station during the ACK information transmission occasion, ACK information associated with the first TB based on the attempted decoding. The operations of 2035 may be performed according to the methods described herein. In some examples, aspects of the operations of 2035 may be performed by an ACK transmission component as described with reference to FIGS. 10 through 13.

Figure 21:
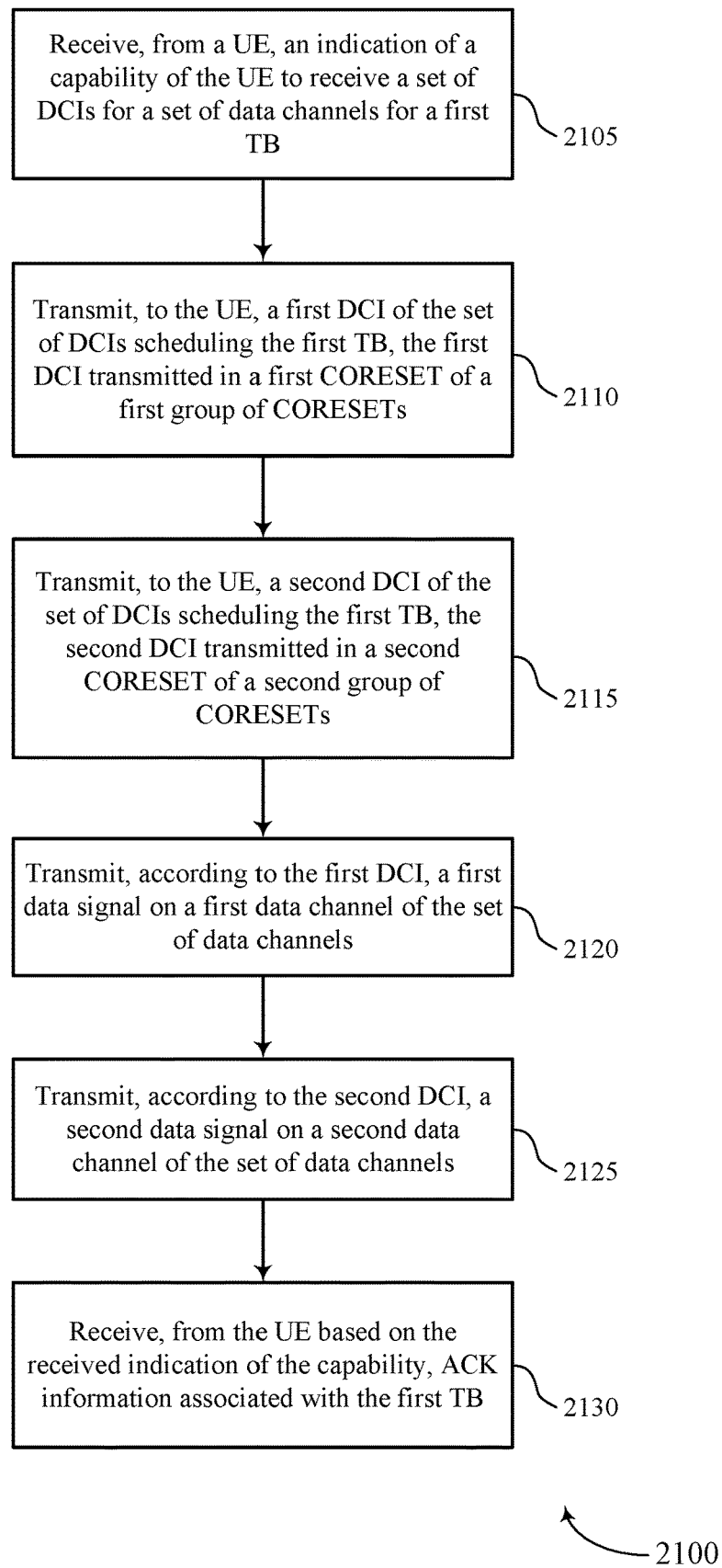

FIG. 21 shows a flowchart illustrating a method 2100 that supports data transmission reliability with multiple DCI signals in accordance with aspects of the present disclosure. The operations of method 2100 may be implemented by a base station 105 or its components as described herein. For example, the operations of method 2100 may be performed by a base station communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may receive, from a UE, an indication of a capability of the UE to receive a set of DCIs for a set of data channels for a first TB. The operations of 2105 may be performed according to the methods described herein. In some examples, aspects of the operations of 2105 may be performed by a multi-DCI indication component as described with reference to FIGS. 14 through 17.

At 2110, the base station may transmit, to the UE, a first DCI of the set of DCIs scheduling the first TB, the first DCI transmitted in a first CORESET of a first group of CORESETs. The operations of 2110 may be performed according to the methods described herein. In some examples, aspects of the operations of 2110 may be performed by a first DCI transmission component as described with reference to FIGS. 14 through 17.

At 2115, the base station may transmit, to the UE, a second DCI of the set of DCIs scheduling the first TB, the second DCI transmitted in a second CORESET of a second group of CORESETs. The operations of 2115 may be performed according to the methods described herein. In some examples, aspects of the operations of 2115 may be performed by a second DCI transmission component as described with reference to FIGS. 14 through 17.

At 2120, the base station may transmit, according to the first DCI, a first data signal on a first data channel of the set of data channels. The operations of 2120 may be performed according to the methods described herein. In some examples, aspects of the operations of 2120 may be performed by a first data signal transmission component as described with reference to FIGS. 14 through 17.

At 2125, the base station may transmit, according to the second DCI, a second data signal on a second data channel of the set of data channels. The operations of 2125 may be performed according to the methods described herein. In some examples, aspects of the operations of 2125 may be performed by a second data signal transmission component as described with reference to FIGS. 14 through 17.

At 2130, the base station may receive, from the UE based on the received indication of the capability, ACK information associated with the first TB. The operations of 2130 may be performed according to the methods described herein. In some examples, aspects of the operations of 2130 may be performed by an ACK information reception component as described with reference to FIGS. 14 through 17.

Figure 22:
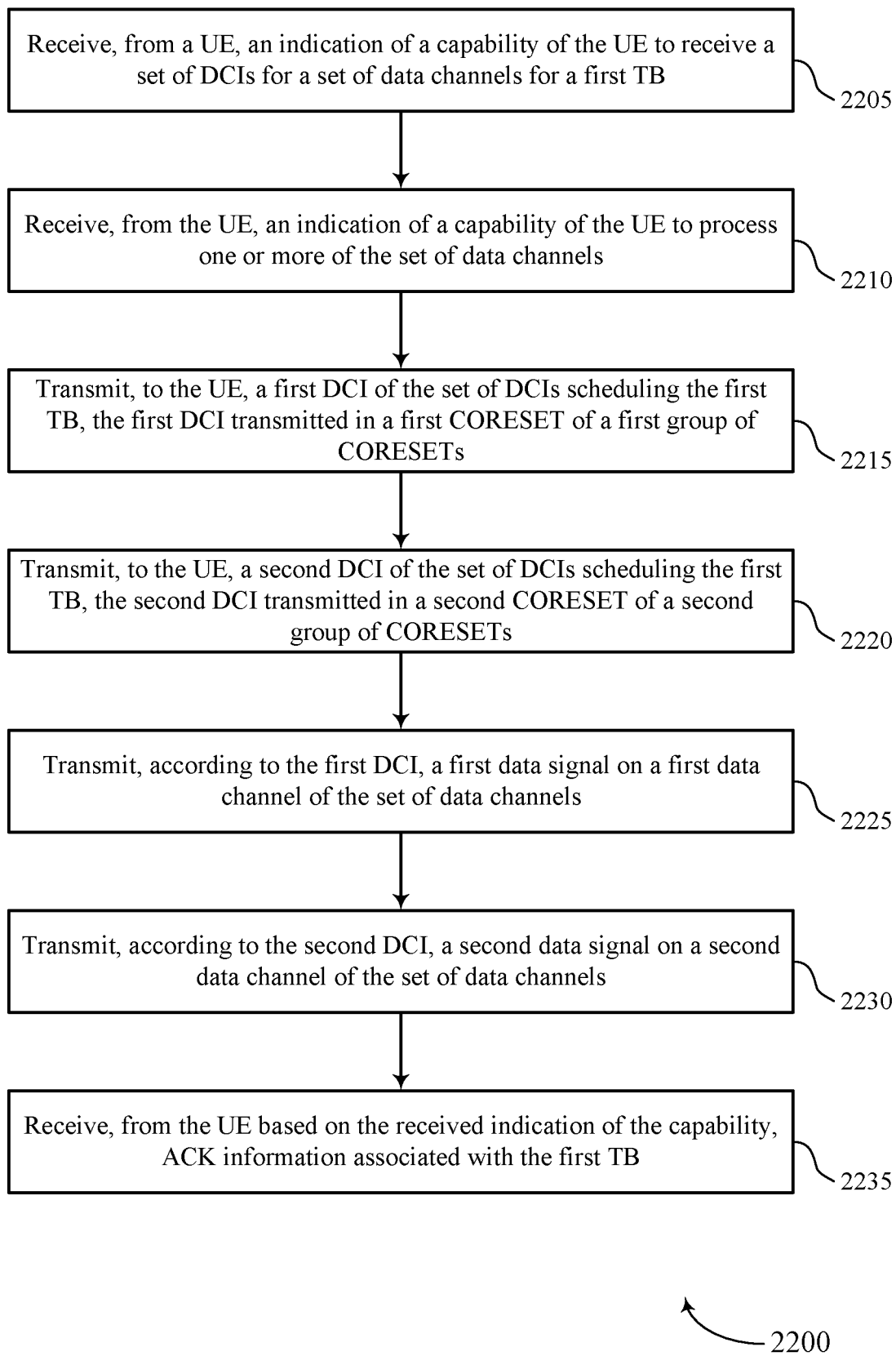

FIG. 22 shows a flowchart illustrating a method 2200 that supports data transmission reliability with multiple DCI signals in accordance with aspects of the present disclosure. The operations of method 2200 may be implemented by a base station 105 or its components as described herein. For example, the operations of method 2200 may be performed by a base station communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2205, the base station may receive, from a UE, an indication of a capability of the UE to receive a set of DCIs for a set of data channels for a first TB. The operations of 2205 may be performed according to the methods described herein. In some examples, aspects of the operations of 2205 may be performed by a multi-DCI indication component as described with reference to FIGS. 14 through 17.

At 2210, the base station may receive, from the UE, an indication of a capability of the UE to process one or more of the set of data channels. The operations of 2210 may be performed according to the methods described herein. In some examples, aspects of the operations of 2210 may be performed by a multi-DCI indication component as described with reference to FIGS. 14 through 17.

At 2215, the base station may transmit, to the UE, a first DCI of the set of DCIs scheduling the first TB, the first DCI transmitted in a first CORESET of a first group of CORESETs. The operations of 2215 may be performed according to the methods described herein. In some examples, aspects of the operations of 2215 may be performed by a first DCI transmission component as described with reference to FIGS. 14 through 17.

At 2220, the base station may transmit, to the UE, a second DCI of the set of DCIs scheduling the first TB, the second DCI transmitted in a second CORESET of a second group of CORESETs. The operations of 2220 may be performed according to the methods described herein. In some examples, aspects of the operations of 2220 may be performed by a second DCI transmission component as described with reference to FIGS. 14 through 17.

At 2225, the base station may transmit, according to the first DCI, a first data signal on a first data channel of the set of data channels. The operations of 2225 may be performed according to the methods described herein. In some examples, aspects of the operations of 2225 may be performed by a first data signal transmission component as described with reference to FIGS. 14 through 17.

At 2230, the base station may transmit, according to the second DCI, a second data signal on a second data channel of the set of data channels. The operations of 2230 may be performed according to the methods described herein. In some examples, aspects of the operations of 2230 may be performed by a second data signal transmission component as described with reference to FIGS. 14 through 17.

At 2235, the base station may receive, from the UE based on the received indication of the capability, ACK information associated with the first TB. The operations of 2235 may be performed according to the methods described herein. In some examples, aspects of the operations of 2235 may be performed by an ACK information reception component as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C, or any combination thereof. Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

What is claimed is:

1. A method for wireless communication at a user equipment (UE), comprising:
    transmitting an indication of a capability of the UE to receive a plurality of downlink control information (DCIs) associated with a transport block and associated with a same feedback process that corresponds to an acknowledgement information transmission occasion, the acknowledgement information transmission occasion occurring after a plurality of data channels for the transport block;
    receiving a first DCI and a second DCI that schedule the transport block, the first DCI received in a first control resource set of a first group of control resource sets and the second DCI received in a second control resource set of a second group of control resource sets, the first DCI and the second DCI of the plurality of DCIs;
    attempting to decode the transport block on data channel resources of the plurality of data channels indicated by both the first DCI and the second DCI; and
    transmitting, during the acknowledgement information transmission occasion, acknowledgement information associated with the transport block based at least in part on the attempted decoding.

2. The method of claim 1, wherein transmitting the indication comprises:
    transmitting, to a network device a UE capability report comprising the indication of the capability of the UE.

3. The method of claim 2, wherein the UE capability report further indicates whether the UE is capable of performing soft combining of the plurality of data channels.

4. The method of claim 1, wherein a payload size of the acknowledgement information is based at least in part on the capability of the UE to receive the plurality of DCIs associated with the transport block and associated with the same feedback process that corresponds to the acknowledgement information transmission occasion.

5. The method of claim 4, wherein a type of the acknowledgement information is configured as dynamic and the payload size of the acknowledgement information associated with each downlink assignment index is a same size.

6. The method of claim 4, wherein a type of the acknowledgement information is configured as semi-static and the payload size of the acknowledgement information associated with each candidate data channel occasion is a same size.

7. The method of claim 1, wherein receiving the first DCI and the second DCI comprises:
    receiving the first DCI and the second DCI, wherein a first total downlink assignment index for the first DCI includes both the first DCI and the second DCI, and wherein the first and second DCIs are received in different physical downlink control channel monitoring occasions.

8. The method of claim 1, wherein receiving the first DCI comprises:
    receiving an indication in the first DCI that a network entity will transmit the second DCI.

9. The method of claim 8, further comprising:
    receiving a third DCI associated with a second transport block, wherein a first payload size of the acknowledgement information associated with the transport block is different than a second payload size of the acknowledgement information associated with the second transport block, and the acknowledgement information associated with the second transport block is transmitted with the acknowledgement information associated with the transport block.

10. The method of claim 1, further comprising:
    separately counting a first set of one or more downlink assignment indices and a second set of one or more downlink assignment indices, wherein the first set of one or more downlink assignment indices is associated with DCIs for transport blocks for which a single DCI is transmitted, and the second set of one or more downlink assignment indices is associated with DCIs for transport blocks for which multiple DCIs are transmitted.

11. The method of claim 1, further comprising:
transmitting a second indication of a second capability of the UE to process one or more of the plurality of data channels.

12. The method of claim 1, wherein the plurality of DCIs indicate a same hybrid automatic repeat request process for the transport block, or a same new data indicator, or a combination thereof.

13. The method of claim 1, wherein the received first DCI and the received second DCI indicate a same set of resources for transmission of the acknowledgement information.

14. The method of claim 1, wherein the received first DCI and the received second DCI indicate different sets of resources for transmission of the acknowledgement information.

15. The method of claim 1, wherein receiving the first DCI and the second DCI comprises:
receiving, from a first network device, the first DCI for the transport block on data channel resources of a first data channel of the plurality of data channels; and
receiving, from a second network device, the second DCI for the transport block on data channel resources of a second data channel of the plurality of data channels.

16. The method of claim 1, further comprising:
determining, that a first cyclic redundancy check value of the first DCI is scrambled with a same radio network temporary identifier as a second cyclic redundancy check value of the second DCI, or that a first set of scheduling information in the first DCI matches a second set of scheduling information in the second DCI, or a combination thereof; and
attempting to decode a first data signal associated with the first DCI and a second data signal associated with the second DCI based at least in part on the determining.

17. A method for wireless communication at a network device, comprising:
receiving an indication of a capability of a user equipment (UE) to receive a plurality of downlink control information (DCIs) associated with a transport block and associated with a same feedback process that corresponds to an acknowledgement information transmission occasion, the acknowledgement information transmission occasion occurring after a plurality of data channels for the transport block;
transmitting a first DCI of the plurality of DCIs scheduling the transport block, the first DCI transmitted in a first control resource set of a first group of control resource sets;
transmitting a second DCI of the plurality of DCIs scheduling the transport block, the second DCI transmitted in a second control resource set of a second group of control resource sets;
transmitting, according to the first DCI, a first data signal on a first data channel of the plurality of data channels;
transmitting, according to the second DCI, a second data signal on a second data channel of the plurality of data channels; and
receiving, from the UE based at least in part on the received indication of the capability, acknowledgement information associated with the transport block.

18. The method of claim 17, wherein receiving the indication comprises:
receiving a UE capability report comprising the indication of the capability of the UE.

19. The method of claim 18, wherein the UE capability report further indicates whether the UE is capable of performing soft combining of the plurality of data channels.

20. The method of claim 17, wherein a payload size of the acknowledgement information is based at least in part on the capability of the UE to receive the plurality of DCIs associated with the transport block and associated with a same feedback process that corresponds to an acknowledgement information transmission occasion.

21. The method of claim 20, wherein a type of the acknowledgement information is configured as dynamic and the payload size of the acknowledgement information associated with each downlink assignment index is a same size.

22. The method of claim 20, wherein a type of the acknowledgement information is configured as semi-static and the payload size of the acknowledgement information associated with each candidate data channel occasion is a same size.

23. The method of claim 17, wherein a first total downlink assignment index for the first DCI counts both the first DCI and the second DCI, and wherein the first and second DCIs are transmitted in different physical downlink control channel monitoring occasions.

24. The method of claim 17, wherein the first DCI comprises an indication that the network device will transmit the second DCI.

25. The method of claim 24, further comprising:
transmitting a third DCI associated with a second transport block, wherein a first payload size of the acknowledgement information associated with the second transport block is different than a second payload size of the acknowledgement information associated with the transport block, and the acknowledgement information associated with the second transport block is received with the acknowledgement information associated with the first transport block.

26. An apparatus for wireless communication at a user equipment (UE), comprising:
a processor,
memory coupled with the processor; and
instructions stored in the memory and executable by the processor to cause the apparatus to:
transmit an indication of a capability of the UE to receive a plurality of downlink control information (DCIs) associated with a transport block and associated with a same feedback process that corresponds to an acknowledgement information transmission occasion, the acknowledgement information transmission occasion occurring after a plurality of data channels for the transport block;
receive a first DCI and a second DCI that schedule the transport block, the first DCI received in a first control resource set of a first group of control resource sets and the second DCI received in a second control resource set of a second group of control resource sets, the first DCI and the second DCI of the plurality of DCIs;
attempt to decode the transport block on data channel resources indicated by both the received first DCI and the received second DCI; and
transmit, during the acknowledgement information transmission occasion, acknowledgement information associated with the transport block based at least in part on the attempted decoding.

27. The apparatus of claim 26, wherein the instructions to transmit the indication are further executable by the processor to cause the apparatus to:
transmit, to a network device, a UE capability report comprising the indication of the capability of the UE.

28. The apparatus of claim 27, wherein the UE capability report further indicates whether the UE is capable of performing soft combining of the plurality of data channels.

29. The apparatus of claim 26, wherein a payload size of the acknowledgement information is based at least in part on the capability of the UE to receive the plurality of DCIs associated with the transport block and associated with the same feedback process that corresponds to the acknowledgement information transmission occasion.

30. An apparatus for wireless communication at a network device, comprising:

a processor, memory coupled with the processor; and instructions stored in the memory and executable by the processor to cause the apparatus to:

receive an indication of a capability of a user equipment (UE) to receive a plurality of downlink control information (DCIs) associated with a transport block and associated with a same feedback process that corresponds to an acknowledgement information transmission occasion, the acknowledgement information transmission occasion occurring after a plurality of data channels;

transmit a first DCI of the plurality of DCIs scheduling the transport block, the first DCI transmitted in a first control resource set of a first group of control resource sets;

transmit a second DCI of the plurality of DCIs scheduling the transport block, the second DCI transmitted in a second control resource set of a second group of control resource sets;

transmit, according to the first DCI, a first data signal on a first data channel of the plurality of data channels;

transmit, according to the second DCI, a second data signal on a second data channel of the plurality of data channels; and receive, from the UE based at least in part on the received indication of the capability, acknowledgement information associated with the transport block.

* * * * *